US010516156B2

(12) United States Patent
Ruth et al.

(10) Patent No.: US 10,516,156 B2
(45) Date of Patent: *Dec. 24, 2019

(54) CHLORINATED LITHIUM MANGANESE OXIDE SPINEL CATHODE MATERIAL WITH CHARGE TRANSFER CATALYST COATING, METHOD OF PREPARING THE SAME, AND LI ELECTROCHEMICAL CELL CONTAINING THE SAME

(71) Applicant: United States Government, as represented by the Secretary of the Army, Aberdeen Proving Ground, MD (US)

(72) Inventors: Ashley L. Ruth, Bel Air, MD (US); Terrill B. Atwater, Bel Air, MD (US); Paula C. Latorre, Bel Air, MD (US)

(73) Assignee: The Government of the United States as represented by the Secretary of the Army, Washington, DC (US)

( * ) Notice: Subject to any disclaimer, the term of this patent is extended or adjusted under 35 U.S.C. 154(b) by 460 days.

This patent is subject to a terminal disclaimer.

(21) Appl. No.: 15/164,068

(22) Filed: May 25, 2016

(65) Prior Publication Data

US 2017/0346074 A1   Nov. 30, 2017

(51) Int. Cl.
*H01M 4/1315* (2010.01)
*H01M 4/62* (2006.01)
(Continued)

(52) U.S. Cl.
CPC ........ *H01M 4/1315* (2013.01); *C01G 49/009* (2013.01); *C01G 51/006* (2013.01);
(Continued)

(58) Field of Classification Search
CPC .. H01M 4/1315; H01M 10/0525; H01M 4/04; H01M 4/13915; H01M 4/38;
(Continued)

(56) References Cited

U.S. PATENT DOCUMENTS

| 5,156,934 A * | 10/1992 | Kainthia | C01G 45/02 252/182.1 |
| 7,011,908 B1 * | 3/2006 | Atwater | C01G 45/00 252/518.1 |

(Continued)

FOREIGN PATENT DOCUMENTS

| KR | 1812269 | * | 1/2018 |
| WO | WO 2014024075 | * | 2/2014 |

OTHER PUBLICATIONS

KR 1812269 MT (Year: 2018).*
KR 1812269 Abstract (Year: 2018).*

*Primary Examiner* — Alexander Usyatinsky
(74) *Attorney, Agent, or Firm* — Azza Jayaprakash

(57) ABSTRACT

A process for preparing a stable $Li_xMn_{2-y}Me_yO_{4-z}Cl_z$ material with a $MO_b$ or $MMn_aO_b$ charge transfer catalyst coating is provided, where Me is Fe, Co, or Ni and M is Bi, As, or Sb. In addition, a $Li_xMn_{2-y}Me_yO_{4-z}Cl_z$ material with a $MO_b$ or $MMn_aO_b$ charge transfer catalyst coating is provided. Furthermore, a lithium or lithium ion rechargeable electrochemical cell is provided, which includes a cathode material (in a positive electrode) containing a $Li_xMn_{2-y}Me_yO_{4-z}Cl_z$ material with a $MO_b$ or $MMn_aO_b$ charge transfer catalyst coating.

8 Claims, 26 Drawing Sheets

(51) Int. Cl.
   *H01M 4/505*      (2010.01)
   *H01M 4/13915*    (2010.01)
   *H01M 4/04*       (2006.01)
   *H01M 10/0525*    (2010.01)
   *C01G 49/00*      (2006.01)
   *C01G 51/00*      (2006.01)
   *C01G 53/00*      (2006.01)

(52) U.S. Cl.
   CPC ........ *C01G 53/006* (2013.01); *H01M 4/0471* (2013.01); *H01M 4/13915* (2013.01); *H01M 4/505* (2013.01); *H01M 4/62* (2013.01); *H01M 10/0525* (2013.01)

(58) Field of Classification Search
   CPC ...... H01M 4/505; H01M 4/62; H01M 4/0471; C01G 53/006; C01G 49/009; C01G 51/006
   See application file for complete search history.

(56) References Cited

U.S. PATENT DOCUMENTS

| | | | | |
|---|---|---|---|---|
| 8,597,377 B1 * | 12/2013 | Atwater | ............. | C01G 45/1242 29/623.1 |
| 2008/0131778 A1 * | 6/2008 | Watanabe | ............. | H01M 4/131 429/220 |
| 2011/0223493 A1 * | 9/2011 | Christian | ................ | H01M 4/06 429/344 |
| 2015/0197872 A1 * | 7/2015 | Ozoemena | ............. | C01G 53/54 117/7 |
| 2016/0351973 A1 * | 12/2016 | Albano | ................ | H01M 4/366 |

* cited by examiner

Discharge capacity at the 150th Cycle at 8 mA/cm² vs. 5th cycle at 2 mA/cm²

Electrochemical Impedance Spectroscopy

CHLORINATED LITHIUM MANGANESE OXIDE SPINEL CATHODE MATERIAL WITH CHARGE TRANSFER CATALYST COATING, METHOD OF PREPARING THE SAME, AND LI ELECTROCHEMICAL CELL CONTAINING THE SAME

GOVERNMENT INTEREST

The invention described herein may be manufactured, used, imported, sold, and licensed by or for the Government of the United States of America without the payment of any royalty thereon or therefor.

FIELD OF THE INVENTION

The present disclosure relates generally to the field of electrochemical power sources and, more particularly, to rechargeable lithium and lithium-ion batteries using manganese-based materials as a positive electrode.

BACKGROUND OF THE INVENTION

Perhaps the most popular battery chemistries that have hit the consumer market recently are lithium-based systems. Lithium batteries use high valence metal oxide materials, which are reduced during the electrochemical reaction. This reaction in rechargeable lithium and rechargeable lithium ion batteries must be fully reversible in order to have a commercially viable cell. These electrochemical systems include manganese-based lithium metal oxides configured in lithium, lithium ion, and lithium polymer electrochemical cells. Common reversible metal oxide materials used in lithium batteries include $Li_xMn_2O_4$, $Li_xMnO_2$, $Li_xCoO_2$, $Li_xNiO_2$, and $Li_xNi_yCo_zO_2$.

Today, rechargeable lithium batteries are used in portable electronic devices including cellular phones and laptop computers. Future use of rechargeable lithium battery systems is targeted at applications related to electronic vehicles and pairing with fuel cells to produce high-energy systems with excellent pulse capabilities. Lithium batteries have the flexibility of being packaged into either cylindrical or prismatic cell designs; this feature makes them applicable to almost any portable electronic system where battery volume is a concern.

The benefits of lithium battery systems include high specific energy (Wh/kg) and high energy density (Wh/l). Lithium electrochemical systems produce a relatively high nominal voltage between 3.0 and 4.75 volts. Lithium electrochemical systems can operate between 3.0 and 4.35 volts or between 2.0 and 3.5 volts. Additionally, lithium electrochemical systems have excellent charge retention due to a low self-discharge rate.

Manganese dioxide ($MnO_2$) based materials are attractive for use as a cathode material in lithium electrochemical systems. $MnO_2$ is attractive because of its high energy density and low material cost. $MnO_2$ is an active material which creates a skeletal structure that allows lithium cations to fill vacancies and voids within the structure. Ideally, this structure does not change with cycling; altering of this crystal structure may cause capacity fading. Additionally, the $MnO_2$ active material exists in different forms. These forms include a lithiated spinel ($Li_xMn_2O_4$) and its different structures denoted by α, β, γ, and λ. In lithium electrochemical cells, the active material is bound to an aluminum current collector with either polytetrafluoroethylene (commercially available under the trade name TEFLON, manufactured by DuPont) or polyvinylidene fluoride mixed with conductive carbon. The conductive carbon serves as an aid for electron transfer.

Capacity fading is a major problem for rechargeable lithium cells. Capacity fading is the loss of cycle capacity in a cell over the life of an electrochemical system, limiting the practical number of cycles that may be used. In lithium battery systems, capacity fading is often attributed to the degradation of the active cathode material. This cyclic capacity loss is a result of both changes in composition and crystal structure of the active cathode material. Additionally, throughout the life of a cell, parasitic side reactions occur between chemical species of all cell components. Methods of reducing this effect include modifying the crystal structure and/or composition of the active material.

Capacity fading associated with the cathode material has also been linked to the fracture of active material and the dissociation or disconnection of the fractured active material from the electrode. Fractures are caused by mechanical stress-strain of $MnO_2$ crystal structures during cycling of the cell. Stress-strain forces act on the crystal structures as a result of repeated phase transitions. These stress-strain forces are due to the insertion and extraction of lithium in the cathode lattice. This frequent conversion in geometry and dimension of the crystal lattice creates a significant mechanical strain on the cathode. This mechanical strain is believed to electrically disconnect active material from the electrode through fracture. Additionally, an external influence, such as elevated temperature, can also promote cathode fracture. In this case, structural vibrations increase with temperature, resulting in the disconnection of the fractured active material from the electrode.

Another major cause of capacity fading in manganese-based cathodes is the dissolution of manganese into the electrolyte. Through a series of chemical reactions, manganese ($Mn^{2+}$) is removed from the cathode and dissolved into the electrolyte, resulting in a decrease of active material in the cathode. Manganese dissolution is linked to reactions with the electrolyte and, more importantly, the impurities dissolved within the electrolyte. Many of these reactions are linked to the water content of the electrolyte and the presence of hydrofluoric acid (HF). The products of parasitic reactions are phase transitions of the $MnO_2$ structure, which results in the formation of $Mn_2O_3$ and $Mn_3O_4$.

Manganese dioxide ($MnO_2$) provides a skeletal background for lithium intercalation during cycling of a lithium electrochemical cell. When fully charged, manganese particles have a meta-stable 4+ valence state. This meta-stable 4+ valence state allows for the attraction and intercalation of lithium cations into the lattice structure. As lithium cations fill the skeleton crystal structure during discharge, the crystal structure of the active material changes. Charging of the cell removes these lithium cations from the cathode, again altering the crystal structure. Ideally, this is a completely efficient and reversible process, but realistically, continuous crystal structure changes lead to phase transitions that can impede lithium mobility. As a result of these phase changes, unwanted crystal structures develop that are either too stable for electrochemical reactions or block the insertion/extraction paths of lithium cations into the cathode material. This general phenomenon is regarded as the major contributor to capacity fading.

$MnO_2$ exists in several phases or crystal structures and are referred to by the following prefixes: α, β, γ, and λ. α-$MnO_2$ is the most stable $MnO_2$ structure. α-$MnO_2$ is one-dimensional and the lattice contains both one by one and two by two channels for lithium insertion/extraction. β-$MnO_2$ is a tetragonal structure with the lattice containing one by one channels for lithium insertion/extraction. $\gamma$-$MnO_2$ is also one-dimensional, existing in both hexagonal and orthorhombic crystal structures with a lattice that contains one by two channels for lithium insertion/extraction. Because of their stability $\alpha$-$MnO_2$, $\beta$-$MnO_2$, and $\gamma$-$MnO_2$ are not considered rechargeable. However, cycling of lithium into the $\alpha$-$MnO_2$, $\beta$-$MnO_2$, and $\gamma$-$MnO_2$ lattice can be achieved with rigid stoichiometric control.

$\lambda$-$MnO_2$ is the conventional form of $MnO_2$ based cathode material for rechargeable lithium electrochemical systems. $\lambda$-$MnO_2$ is created through the delithiation of $Li_xMn_2O_4$ $AB_2O_4$ spinel. The $\lambda$-$MnO_2$ crystal structure is maintained through both charge and discharge of the $LiMn_2O_4$ spinel. The maintenance of the $\lambda$-$MnO_2$ structure during insertion and extraction of lithium in the $Li_xMn_2O_4$ spinel makes it an attractive couple with lithium for rechargeable electrochemical systems. The $\lambda$-$MnO_2$ crystal structure is a three dimensional cubic array. This crystal structure promotes mechanical stability and adequate pathways for lithium insertion/extraction. Degradation of the $\lambda$-$MnO_2$ crystal structure, forming $\alpha$, $\beta$, or $\gamma$-$MnO_2$ crystals and other $Mn_xO_y$ phases, reduces the capacity of the cathode material.

As lithium intercalates, the size and orientation of the crystal structures change. In $Li_xMn_2O_4$ spinel materials, when $0.05<x<1$, the crystal structure is cubic ($\lambda$-$MnO_2$). When $1<x<1.8$, the structure of $Li_xMn_2O_4$ (no longer a $AB_2O_4$ spinel) is tetragonal. Additionally, when $x<0.05$, a phase transition to the more stable $\alpha$, $\beta$, and $\gamma$ $MnO_2$ can occur. Continued charge and discharge promotes the transformation of the cubic crystal structure to other cubic, tetragonal, and monoclinic phases. Tetragonal and monoclinic crystal structures may become inactive, leading to the loss of active cathode material.

Voltage control, maintaining $0.05<x<1$, allows for the mitigation of the formation of unwanted crystal structures. When the potential of the lithium/$Li_xMn_2O_4$ electrochemical system is maintained between 3.0 and 4.25 volts, the cubic phase is maintained. Once the potential of the system drops below 3.0 volts, the $Li_xMn_2O_4$ cathode material undergoes a phase change from cubic to tetragonal. When the potential of the system increases above 4.25 volts, the $Li_xMn_2O_4$ cathode material becomes stripped of the lithium component and undergoes a phase change from cubic ($\lambda$-$MnO_2$) to the more stable $\alpha$, $\beta$ and/or $\gamma$ $MnO_2$.

Other phase transitions that lead to capacity fading include the formation of $Mn_2O_3$ and $Mn_3O_4$. The $Mn_2O_3$ and $Mn_3O_4$ formations result from the liberation of oxygen in the $MnO_2$ and $Mn_2O_4$ structures. The valence state of manganese in these structures is 3+ or less. This lower valence state creates a stable crystal structure that is not conducive to lithium intercalation and, therefore, not rechargeable. As more $Mn_2O_3$ and $Mn_3O_4$ are formed, less $MnO_2$ and $Mn_2O_4$ remain and the usefulness of the cathode decreases.

Thus, one of the disadvantages of conventional lithium manganese-based $AB_2O_4$ spinel materials is the limited cycle life and limited rate capability for lithium electrochemical systems. Furthermore, this problem is a major obstacle for rechargeable lithium battery technology. An additional limiting factor for lithium manganese-based $AB_2O_4$ spinel materials is the time required to process the raw materials and synthesize the desired product; conventional methods require multiple mixing, grinding and calcining steps, which take days to complete.

SUMMARY OF THE INVENTION

The present disclosure resolves the aforementioned problems with rate capability associated with conventional lithium manganese-based $AB_2O_4$ spinel cathode materials in lithium electrochemical systems and rechargeable lithium electrochemical systems. More specifically, the present "O" site and "B" site modified lithium manganese-based $AB_2O_4$ spinel cathode material, which has a surface charge transfer catalyst coating, exhibits improved rate capability and under-voltage tolerance and high rate durability, avoiding problems associated with loss of reversibility in lithium batteries without suffering from the disadvantages, limitations, and shortcomings associated with rigid current limits and rigid stoichiometry control. "O" site modification describes substituting an alternative element on the "O" site of the $AB_2O_4$ spinel; likewise "B" site modification describes an alternative element substitution for the "B" site of the $AB_2O_4$ spinel. These benefits are also demonstrated in the "B" and "O" site modified $AB_2O_4$ spinel cathode material with the surface charge transfer catalyst coating. In addition, the presently disclosed cathode materials meet other significant lithium battery operational objectives (e.g., low impedance and thermal stability).

In addition, the cycle life of the lithium cells fabricated using the present spinel material is significantly longer than cells fabricated using conventional lithium manganese-based $AB_2O_4$ spinel materials. The charge transfer catalyst coated and chlorine-modified $Li_xMn_2O_{4-z}Cl_z$ or $Li_xMn_{2-y}Me_yO_{4-z}Cl_z$ cathode material allows for over-discharge protection. Reversibility in the material is maintained after cell potential excursions less than 2.0 volts are performed. When the charge transfer catalyst coated and chlorine-modified $Li_xMn_2O_{4-z}Cl_z$ or $Li_xMn_{2-y}Me_yO_{4-z}Cl_z$ cathode material is coupled with a lithium anode, it successfully cycles between 4.5 and 2.0 volts without significant degradation. In contrast, conventional $Li_xMn_2O_4$ cathode materials tend to degrade as a result of stress/strain-induced material fracture and formation of $Mn_2O_3$ and $Mn_3O_4$. Furthermore, the relatively low temperatures of the preparation method according to the present disclosure afford better process control, and the fabrication time of the present disclosure is significantly lower than that of the conventional lithium manganese-based $AB_2O_4$ spinel materials.

In one embodiment, a method of preparing a charge transfer catalyst coated homogeneously dispersed "O" site modified lithium manganese-based $AB_2O_4$ spinel cathode material includes mixing a lithium source, a chlorine source, and a manganese source to form a first mixture. The first mixture is calcined to produce a homogeneously dispersed "O" site modified lithium manganese-based $AB_2O_4$ spinel cathode material. Then, the homogeneously dispersed "O" site modified lithium manganese-based $AB_2O_4$ spinel cathode material, a charge transfer catalyst salt, and a chelating agent are mixed to produce a second mixture. The second mixture is heated to produce a gel, and the gel is ignited to form an ash. The ash is calcined to produce a homogeneously dispersed "O" site modified lithium manganese-based $AB_2O_4$ spinel cathode material including a charge transfer catalyst coating. The charge transfer catalyst coating contains $MO_b$ and/or $MMn_aO_b$, and M is bismuth, arsenic, or antimony. According to another aspect of the present disclosure, a method of preparing a charge transfer catalyst coated homogeneously dispersed "O" site and "B" site modified lithium manganese-based $AB_2O_4$ spinel cathode material is provided.

In another embodiment, a homogeneously dispersed, chlorine-modified lithium manganese-based $AB_2O_4$ spinel cathode material including $Li_xMn_{2-y}Me_yO_{4-z}Cl_z$ and a charge transfer catalyst coating is described. The charge transfer catalyst coating contains $MO_b$ and/or $MMn_aO_b$; Me is iron, cobalt, or nickel; and M is bismuth, arsenic, or antimony. In this embodiment, the $Li_xMn_{2-y}Me_yO_{4-z}Cl_z$ is O-site modified. In another aspect of the present disclosure, the charge transfer catalyst coated $Li_xMn_{2-y}Me_yO_{4-z}Cl_z$ is "O" site and "B" site modified.

In yet another embodiment, the present disclosure provides a lithium electrochemical cell that includes an anode and a cathode including the present charge transfer catalyst coated "O" site modified lithium manganese-based $AB_2O_4$ spinel cathode material. In another aspect of the present disclosure, an electrochemical cell is described that includes an anode and a cathode including the present charge transfer catalyst coated "O" site and "B" site modified lithium manganese-based $AB_2O_4$ spinel cathode material.

BRIEF DESCRIPTION OF THE DRAWINGS

The accompanying drawings, which are included to provide further understanding of the present disclosure, and are incorporated in and constitute a part of the specification, illustrate exemplary embodiments of the present disclosure, and together with the description serve to explain the principles of the present disclosure. The present disclosure will now be described further with reference to the accompanying drawings as follows.

DETAILED DESCRIPTION

Figure 1:
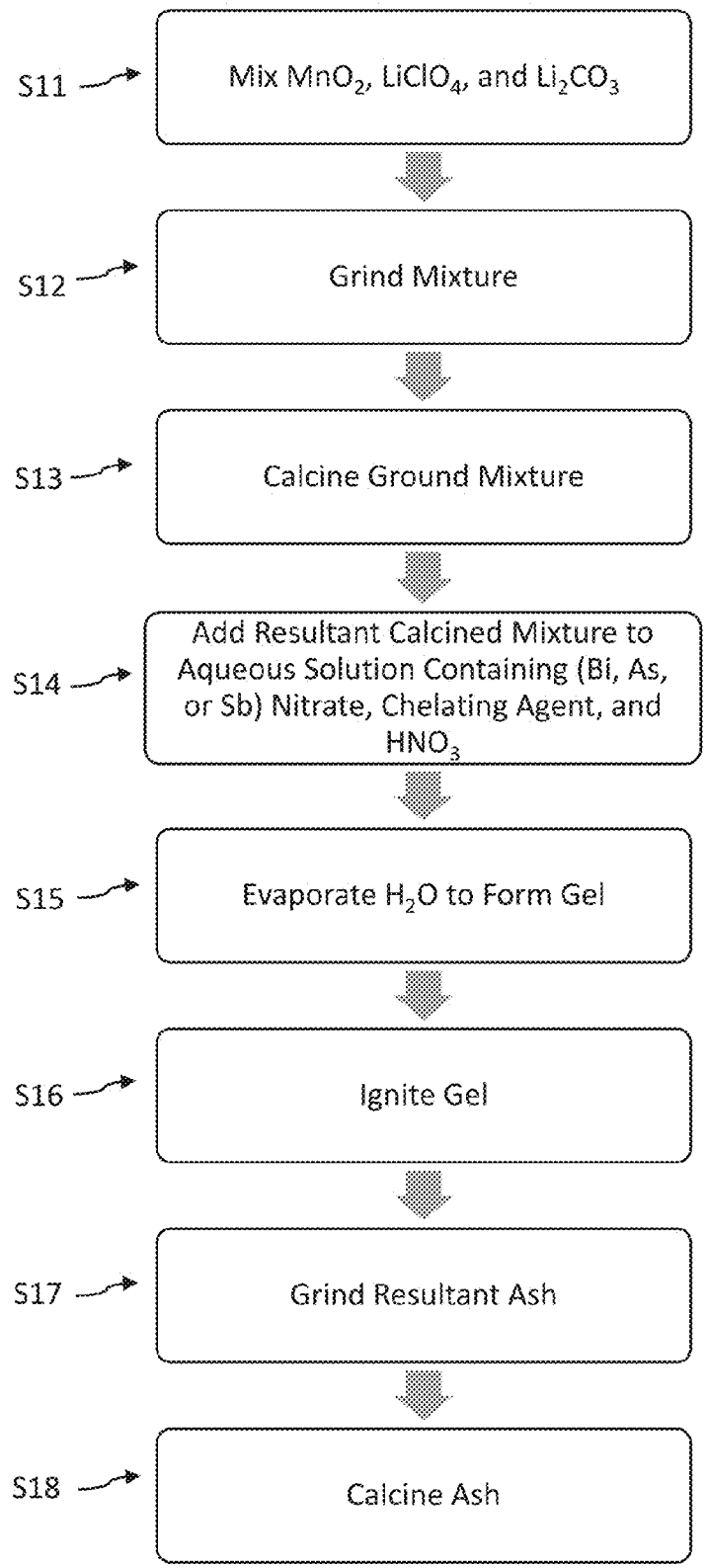
FIG. 1 is a flowchart illustrating process steps in an exemplary embodiment of the present disclosure, which yields a charge transfer catalyst coated chlorine "O" site modified $AB_2O_4$ spinel material.

FIG. 1 is a flowchart illustrating process steps in an exemplary embodiment of the present disclosure. More specifically, FIG. 1 shows exemplary steps according to the present disclosure for the preparation of $Li_xMn_2O_{4-z}Cl_z$, with X mol % $MO_b$, or $MMn_aO_b$ coating where M is a charge transfer catalyst metal Bi, As, or Sb via a method comprising an initial solid state milling and calcining process followed by a nitrate flame process with a calcining reaction to add the charge transfer catalyst coating. In Step S11, manganese oxide, lithium perchlorate, and lithium carbonate are mixed together and ground in Step S12. Lithium hydroxide, lithium oxide, or lithium peroxide may be substituted for lithium carbonate. This mixture is then calcined in Step S13 in a furnace at 600° C. for 2 hours. Alternatively, suitable calcination temperatures and times range from 350° C. to 800° C. (for 1 to 4 hours), from 400° C. to 600° C. (for 1.5 to 3 hours), or from 500° C. to 600° C. (for 2 to 2.5 hours). The resulting "O" site modified $Li_xMn_2O_{4-z}Cl_z$ yields material with x ranging from 0.05 to 1.9, 0.8 to 1.3, or 0.9 to 1.1; and z ranging from 0.005 to 0.25, 0.005 to 0.05, or 0.015 to 0.035.

In Step S14 of FIG. 1, the charge transfer catalyst salts and a chelating agent are dissolved in distilled or deionized water and nitric acid, and this solution is added to the calcined mixture. Suitable charge transfer catalyst salts include, but are not limited to, bismuth nitrate, arsenic nitrate, and antimony nitrate. Suitable chelating agents include, but are not limited to, glycine, cellulose, citric acid, a cellulose-citric acid mixture, and urea. Suitable volumetric quantities of nitric acid range from 5 vol % to 20 vol % in distilled or deionized water. In Step S15, the resultant mixture is heated to create a gel. Heating may be accomplished using a hot plate. In Step S16, the gel is heated further until auto ignition occurs. The resultant ash is ground and calcined in a furnace at 600° C. for 2 hours in Steps S17 and S18, respectively. Grinding may be accomplished using a mortar and pestle or any other conventional grinding methods. Suitable alternative calcination temperatures and times range from 350° C. to 800° C. (for 1 to 4 hours), from 400° C. to 600° C. (for 1.5 to 3 hours), or from 500° C. to 600° C. (for 2 to 2.5 hours). In the $MO_b$ or $MMn_aO_b$ coating, X ranges from 0.5 to 25, 1 to 20, or 3 to 15. In the final "O" site modified $Li_xMn_2O_{4-z}Cl_z$ material with the $MO_b$ or $MMn_aO_b$ coating, x ranges from 0.05 to 1.9, 0.8 to 1.3, or 0.9 to 1.1. In addition, z ranges from 0.005 to 0.25, 0.005 to 0.05, or 0.015 to 0.035. Also, a ranges from 0 to 10. Moreover, b ranges from 0 to 22, or b is greater than 0 but less than or equal to 22.

Figure 2:
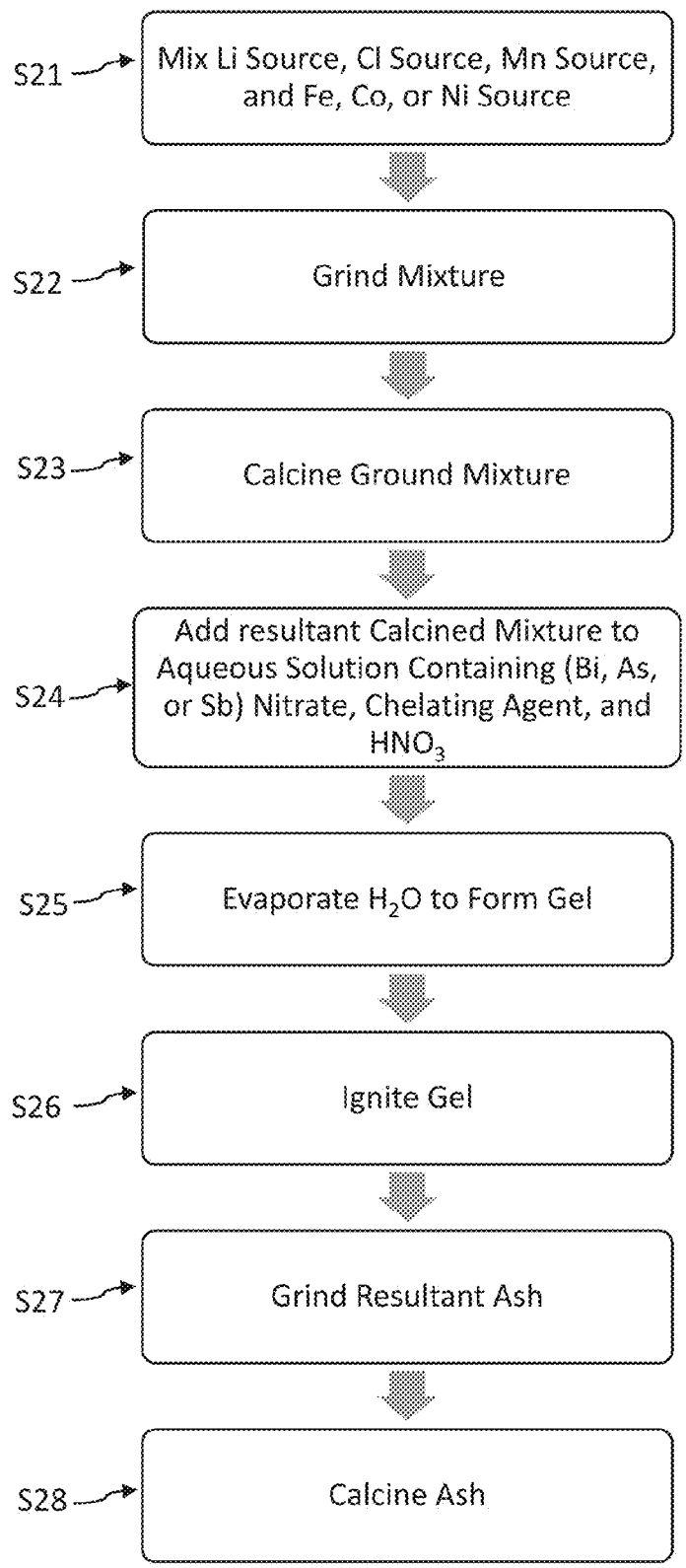
FIG. 2 is a flowchart illustrating process steps in an exemplary embodiment of the present disclosure, which yields a charge transfer catalyst coated "B" and "O" site modified $AB_2O_4$ spinel material.

FIG. 2 is a flowchart illustrating process steps in an exemplary embodiment of the present disclosure. More specifically, FIG. 2 shows exemplary steps according to the present disclosure for the preparation of $Li_xMn_2O_{4-z}Cl_z$ or $Li_xMn_{2-y}Me_yO_{4-z}Cl_z$, where Me is Fe, Co, or Ni, with X mol % $MO_b$ or $MMn_aO_b$ coating, where M is a charge transfer catalyst metal Bi, As, or Sb, via a method comprising an initial $Li_xMn_{2-y}Me_yO_{4-z}Cl_z$ formulation and calcining process, followed by a nitrate flame process with a calcining reaction to add the charge transfer catalyst coating.

In Step S21, a lithium source, a manganese source, a metal source (where the metal is Fe, Co, or Ni), and a chlorine source are mixed together and ground in Step S22. This mixture is then calcined in Step S23 in a furnace for 600° C. for 2 hours. Alternatively, suitable calcination temperatures and times range from 350° C. to 800° C. (for 1 to 4 hours), from 400° C. to 600° C. (for 1.5 to 3 hours), or from 500° C. to 600° C. (for 2 to 2.5 hours). This process is followed by a nitrate flame process with a calcining reaction to add the charge transfer catalyst coating (Steps 24-28).

In one embodiment, suitable lithium sources include, but are not limited to, lithium carbonate, lithium hydroxide, lithium oxide, lithium peroxide, and lithium nitrate. The manganese source and the metal source may be derived from a single source, which is a metal oxide such as $(MnMe_f)O_2$, $(MnMe_f)_2O_3$, $(MnMe_f)_3O_4$, or $(MnMe_f)O$, where Me is Fe, Co, or Ni, and the Mn to Me ratio is 1 to 0.0-0.43. For example, the metal oxide may be $MnO_2$ or $(Mn_{0.95}Fe_{0.05})_2O_3$. Suitable chlorine sources include, but are not limited to, lithium perchlorate, lithium chloride, manganese chloride, iron chloride, cobalt chloride, and nickel chloride. These materials are mixed together and ground using conventional grinding methods. Suitable conventional grinding methods include, but are not limited to, using a mortar and pestle. This mixture is then calcined in Step S23 in a furnace at 600° C. for 2 hours. Alternatively, suitable calcination temperatures and times range from 350° C. to 800° C. (for 1 to 4 hours), from 400° C. to 600° C. (for 1.5 to 3 hours), or from 500° C. to 600° C. (for 2 to 2.5 hours).

In Step S24 of FIG. 2, the charge transfer catalyst salts and a chelating agent are dissolved in distilled or deionized water and nitric acid, and this solution is added to the calcined mixture. Suitable charge transfer catalyst salts include, but are not limited to, bismuth nitrate, arsenic nitrate, and antimony nitrate. Suitable chelating agents include, but are not limited to, glycine, cellulose, citric acid, a cellulose-citric acid mixture, and urea. Suitable volumetric quantities of nitric acid range from 5 vol % to 20 vol % in distilled or deionized water. In Step S25, the resultant mixture is heated to create a gel. Heating may be accomplished using a hot plate. In Step S26, the gel is heated further until auto ignition occurs. The resultant ash is ground and calcined in a furnace at 600° C. for 2 hours in Steps S27 and S28, respectively. A mortar and pestle may be used for grinding. Suitable alternative calcination temperatures and times range from 350° C. to 800° C. (for 1 to 4 hours), from 400° C. to 600° C. (for 1.5 to 3 hours), or from 500° C. to 600° C. (for 2 to 2.5 hours). In the final "B" and "O" site modified $Li_xMn_{2-y}Me_yO_{4-z}Cl_z$ material, where Me is Fe, Co, or Ni with a $MO_b$ or $MMn_aO_b$ charge transfer catalyst coating, x ranges from 0.05 to 1.9, 0.8 to 1.3, or 0.9 to 1.1; y ranges from 0.00 to 0.60, 0.005 to 0.3, or 0.03 to 0.3; and z ranges from 0.005 to 0.25, 0.005 to 0.05, or 0.015 to 0.035. In the $MO_b$ or $MMn_aO_b$ coating, X ranges from 0.5 to 25, 1 to 20, or 3 to 15. Regarding the charge transfer catalyst coating, a ranges from 0 to 10. Additionally, b ranges from 0 to 22, or b is greater than 0 but less than or equal to 22.

In an exemplary embodiment, the lithium source is lithium nitrate, the manganese source is manganese nitrate, the metal source is a Group VIII Period 4 element (Fe, Co, or Ni) nitrate, and the chlorine source is a chlorine-containing salt. These materials are mixed together in Step 21. Suitable alternative lithium sources include, but are not limited to, lithium carbonate, lithium hydroxide, and lithium chloride. Suitable alternative manganese sources include, but are not limited to, manganese chloride, manganese hydroxide, and manganese carbonate. Suitable chlorine-containing salts include, but not limited to, lithium chloride, manganese chloride, iron chloride, cobalt chloride, and nickel chloride. In this embodiment, a chelating agent is added to the mixture and the resulting mixture is dissolved in distilled or deionized water. Suitable chelating agents include, but are not limited to, glycine, cellulose, citric acid, a cellulose-citric acid mixture, and urea. In this embodiment, two additional steps occur before the grinding step: First, the solution is heated until the water fully evaporates and a gel is formed. Heating may be accomplished on a hot plate. Second, the gel is heated further until auto ignition occurs and forms an ash. The ash is collected and ground in Step S22. A mortar and pestle may be used for grinding. It is to be understood by one of ordinary skill in the art that grinding may be accomplished by other means. This mixture is then calcined in Step S23 in a furnace at 600° C. for 2 hours. Alternatively, suitable calcination temperatures and times range from 350° C. to 800° C. (for 1 to 4 hours), from 400° C. to 600° C. (for 1.5 to 3 hours), or from 500° C. to 600° C. (for 2 to 2.5 hours).

In Step S24 of FIG. 2, the resultant calcined mixture, a charge transfer catalyst salt, and a chelating agent are dissolved in distilled or deionized water and nitric acid to form a solution. Suitable charge transfer catalyst salts include, but are not limited to, bismuth nitrate, arsenic nitrate, and antimony nitrate. Suitable chelating agents include, but are not limited to, glycine, cellulose, citric acid, a cellulose-citric acid mixture, and urea. Suitable volumetric quantities of nitric acid range from 5 vol % to 20 vol % in distilled or deionized water. In Step S25, the resultant mixture created in Step S24 is heated to form a gel. Heating may be accomplished on a hot plate. In Step S26, the gel is heated further until auto ignition occurs. The resultant ash is ground and calcined in a furnace at 600° C. for 2 hours in Steps S27 and S28, respectively. Alternatively, suitable calcination temperatures and times range from 350° C. to 800° C. (for 1 to 4 hours), from 400° C. to 600° C. (for 1.5 to 3 hours), or from 500° C. to 600° C. (for 2 to 2.5 hours). In the final "B" and "O" site modified $Li_xMn_{2-y}Me_yO_{4-z}Cl_z$ material where Me is Fe, Co, or Ni with a $MO_b$ or $MMn_aO_b$ coating, x ranges from 0.05 to 1.9, 0.8 to 1.3, or 0.9 to 1.1; y ranges from 0.00 to 0.60, 0.005 to 0.3, or 0.03 to 0.3; and z ranges from 0.005 to 0.25, 0.005 to 0.05, or 0.015 to 0.035. In the $MO_b$ or $MMn_aO_b$ coating, X ranges from 0.5 to 25, 1 to 20, or 3 to 15. Regarding the $MO_b$ or $MMn_aO_b$ coating, a ranges from 0 to 10. Moreover, b ranges from 0 to 22, or b is greater than 0 but less than or equal to 22.

The exemplary process described above results in the formulation of a family of "B" and "O" site modified $Li_xMn_{2-y}Me_yO_{4-z}Cl_z$, where Me is Fe, Co or Ni with X mol % $MO_b$ or $MMn_aO_b$ coating. The general formula for the lithium electrochemical cell cathode prepared is $Li_xMn_{2-y}Me_yO_{4-z}Cl_z$ with X mol % $MO_b$ or $MMn_aO_b$ coating, where M is iron, cobalt or nickel, and x 1 and proves to be reversible between 4.5 and 2.0 volts. This reversible region for x in a lithium electrochemical cell comprised of the present disclosure ranges from 0.05 to 1.9, y ranges from 0.0 to 0.6, and z ranges from 0.005 to 0.25.

Figure 3:
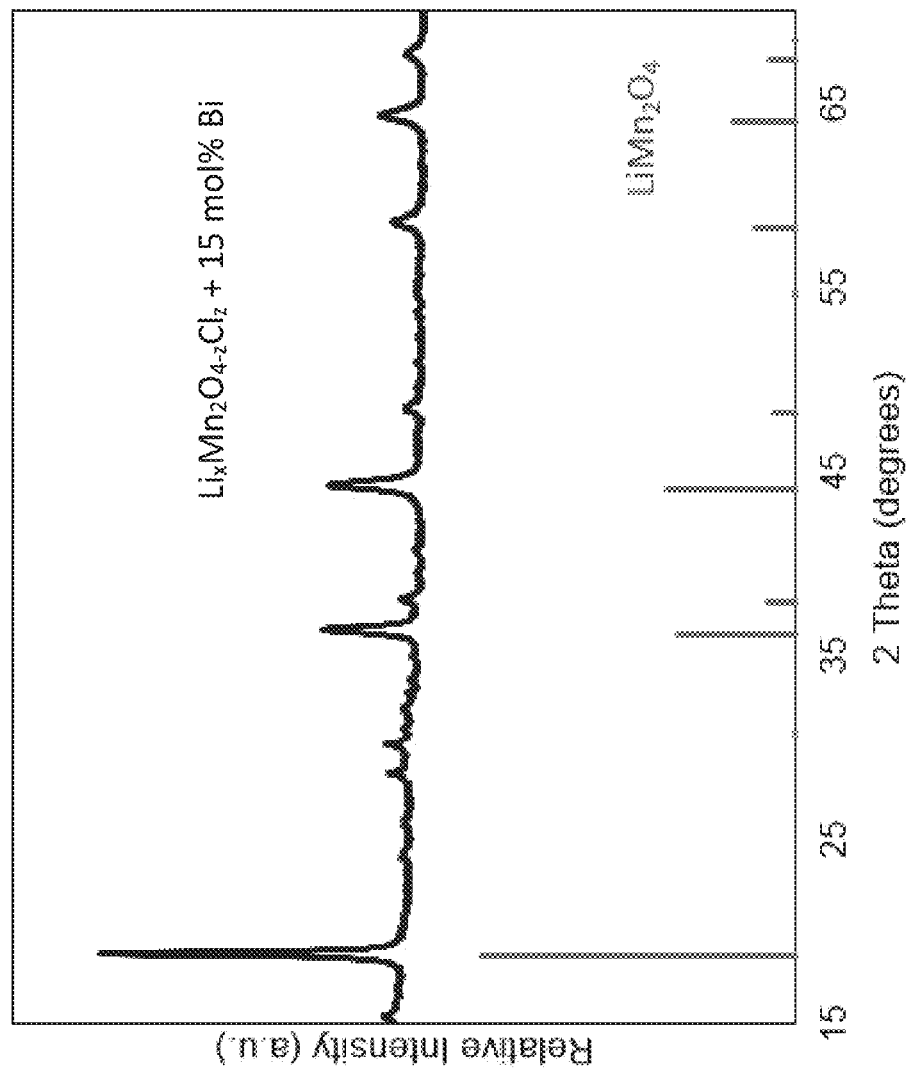
FIG. 3 is a graph showing x-ray diffraction data for an exemplary formulation mixture according to exemplary embodiments of the present disclosure compared to an undoped spinel material used as a reference standard.
Figure 4:
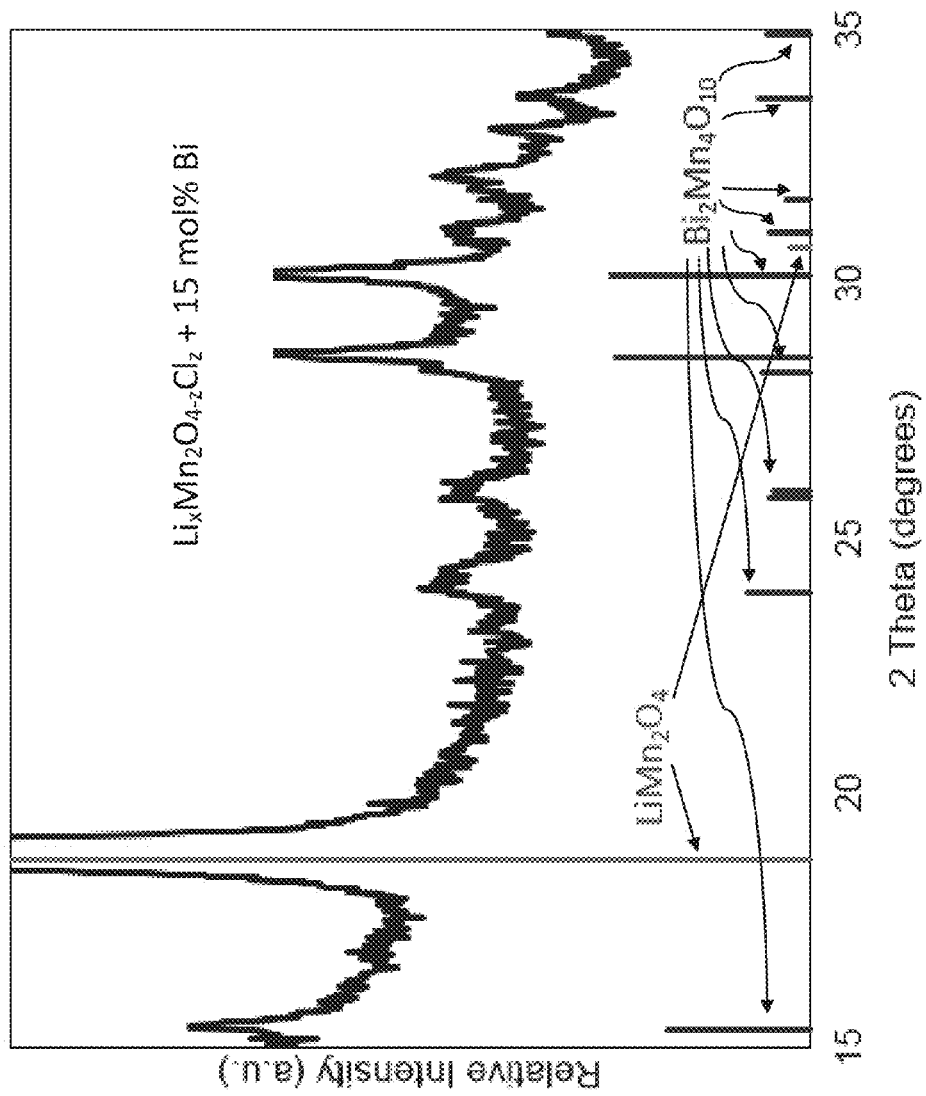
FIG. 4 is a graph showing x-ray diffraction data for a narrow region for an exemplary formulation mixture according to exemplary embodiments of the present disclosure, compared to $LiMn_2O_4$ and $Bi_2Mn_4O_{10}$ as reference standards.
Figure 5:
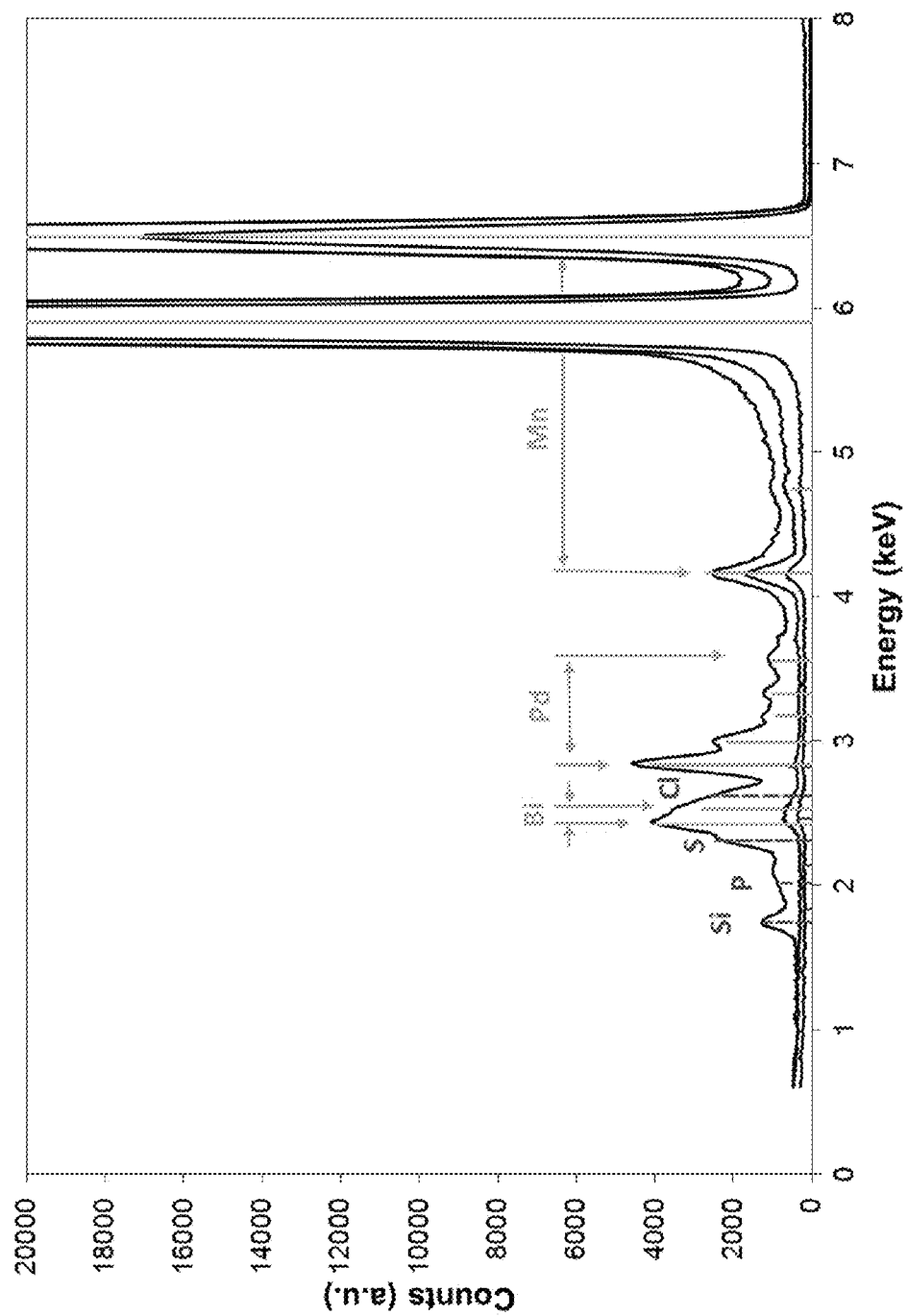
FIG. 5 is a graph showing x-ray fluorescence data for an exemplary formulation mixture according to exemplary embodiments of the present disclosure, compared to Si, P, S, Bi, Cl, Pd, and Mn as reference standards.
Figure 6:
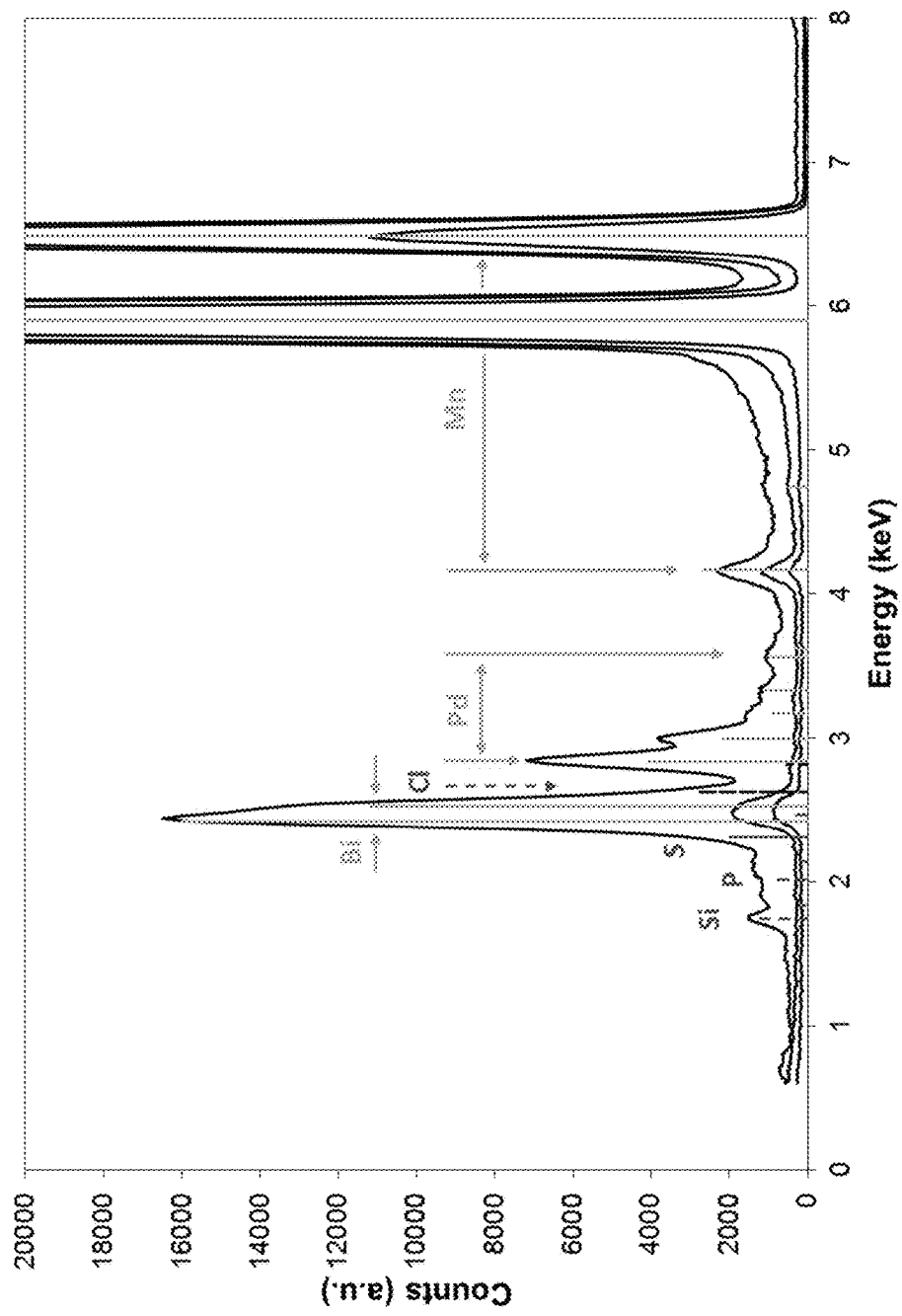
FIG. 6 is a graph showing x-ray fluorescence data for an exemplary formulation mixture according to exemplary embodiments of the present disclosure, compared to Si, P, S, Bi, Cl, Pd, and Mn as reference standards.

FIGS. 3 and 4 show the X-ray diffraction pattern of an exemplary formulation mixture according to exemplary embodiments of the present disclosure compared to known reference standards. The figures show the final $Li_xMn_2O_{4-z}Cl_z$ with 15 mol % Bi of the form $Bi_2Mn_4O_{10}$ coating material according to the present disclosure. The bismuth to manganese ratio is 0.149, or approximately 15 mol %. Included in FIG. 4 is the standard data for intensity and location from the International Center for Diffraction Data for $Bi_2Mn_4O_{10}$ (JCPDS catalog number 027-0048) and $LiMn_2O_4$ spinel (JCPDS catalog number 018-0736). FIGS. 5 and 6 show the X-ray fluorescence (XRF) pattern for an exemplary formulation mixture of the present disclosure. Included in FIGS. 5 and 6 is the data describing the final $Li_xMn_2O_{4-z}Cl_z$ with 3 mol % and 15 mol % Bi material, respectively (which equates to bismuth to manganese ratios of 0.0379 and 0.149), as well as intensity and energy level for the system components. These components include the palladium X-ray source and silicon, sulfur, and phosphorus from the sample holder. XRF is performed on every sample for determining the mol % of M contained within the material.

Figure 7:
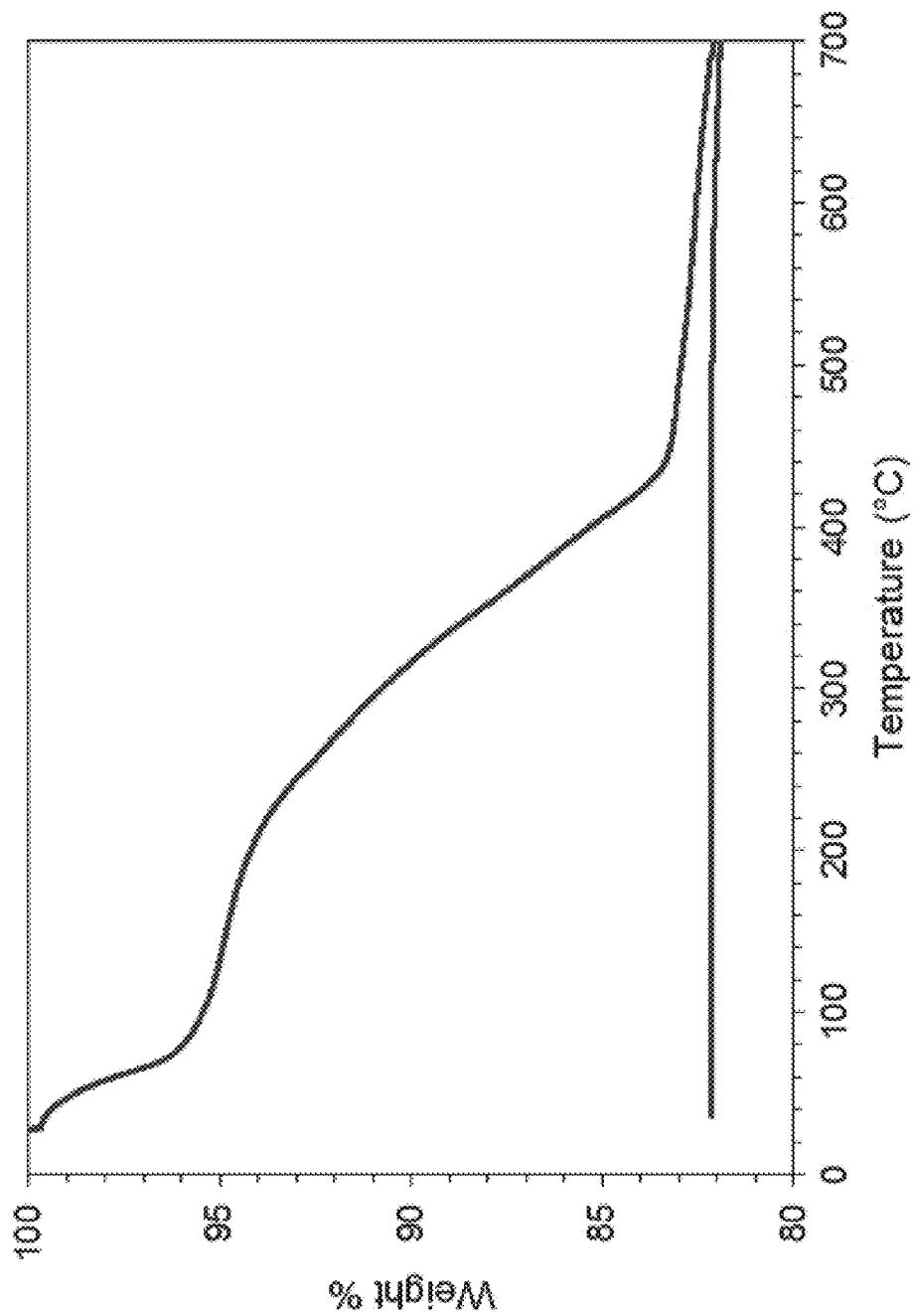
FIG. 7 is a graph showing thermogravimetric analysis results for an exemplary formulation mixture according to exemplary embodiments of the present disclosure.

FIG. 7 shows the thermogravimetric analysis results of $Li_xMn_2O_{4-z}Cl_z$ spinel with X mol % Bi added at Step S17 prior to calcination according to exemplary embodiments of the present disclosure. In the exemplary image shown in FIG. 7, the bismuth to manganese ratio is 0.135, or approximately 13 mol %. Between 30 and 120° C., the mass loss can be attributed to the dehydration of the physically absorbed water molecules. From 200 to 300° C., a mass loss is observed and can be attributed to the melting and denitration of remaining nitrates in the precursor via $NO_2$ evolution. In the 300 to 400° C. range, the mass loss could be due to residual glycine decomposition into $CO_2$, $N_2$, and $H_2O$ in combination with formation of the spinel. Between 400 and 500° C., a slight mass increase occurs due to oxidation. Above 500° C., the mass loss is most likely due to chlorine evolution.

Figure 8:
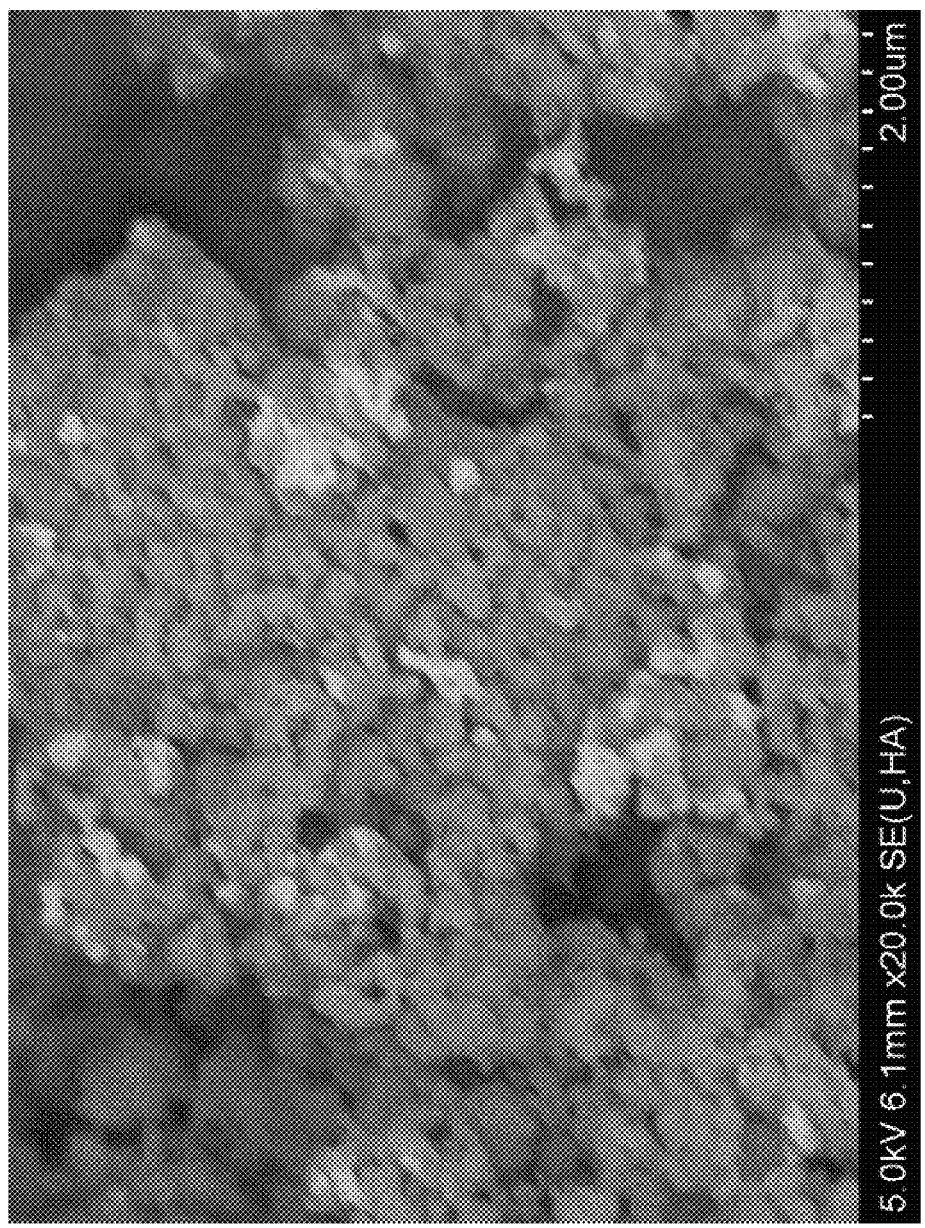
FIG. 8 is a backscattered scanning electron microscope (SEM) image of the particles of an exemplary formulation mixture according to exemplary embodiments of the present disclosure.

FIG. 8 shows a backscattered SEM image of the final $Li_xMn_2O_{4-z}Cl_z$ spinel with 15 mol % Bi coating according to an exemplary embodiment of the present disclosure. This image was taken with the following SEM settings: 5.0 kV, 6.1 mm×20.0 k SE(U,HA). The contrast is due to the Z scatter of the contained elements showing a majority gray structure with submicron second phase $Bi_2Mn_4O_{10}$ in a pale gray dispersed on the surface. In the exemplary image shown in FIG. 8, bismuth is the charge transfer catalyst coating on the modified lithium manganese-based $AB_2O_4$ spinel cathode material.

In order to evaluate the electrochemical properties of the present $Li_xMn_2O_{4-z}Cl_z$ or $Li_xMn_{2-y}Me_yO_{4-z}Cl_z$, where Me is Fe, Co, or Ni with X mol % $MO_b$ or $MMn_aO_b$ coating in an electrochemical system, laboratory coin cells were fabricated using conventional methods described in detail below. Experimental cells may also be fabricated using other methods known in the art, incorporating the charge transfer catalyst coated $Li_xMn_2O_{4-z}Cl_z$ or the charge transfer catalyst coated $Li_xMn_{2-y}Me_yO_{4-z}Cl_z$, where Me is Fe, Co, or Ni, lithium manganese-based $AB_2O_4$ spinel material described in the present disclosure. The experimental cells were composed of a lithium anode separated from a polytetrafluoroethylene (commercially available under the trade name TEFLON, manufactured by DuPont) bonded cathode with a nonwoven glass separator. Other suitable anode materials include, but are not limited to, lithium metal, lithium aluminum alloy, lithium silicon alloy, graphite and graphite derivatives, tin oxide, and lithium phosphate. The cathode was fabricated by combining $Li_xMn_{2-y}Me_yO_{4-z}Cl_z$, carbon, and polytetrafluoroethylene in a 75:15:10 weight percent basis, respectively. Suitable conductive carbon materials include, but are not limited to, conductive carbon black (commercially available from various sources, including Cabot Corporation, under the trade name VULCAN XC72 or VULCAN XC72R), graphite, carbon nanofibers, and carbon nanoparticles (commercially available under the trade name PURE BLACK, manufactured by Superior Graphite Co.). Suitable binders include, but are not limited to, polytetrafluoroethylene, polyvinylidene fluoride (PVDF), and latex. The cathode may contain by weight 40%-95% $Li_xMn_{2-y}Me_yO_{4-z}Cl_z$ with X mol % $MO_b$ or $MMn_aO_b$ (where X ranges from 0.5 to 25.0, 1 to 20, or 3 to 15), 1%-40% of conductive carbon, and 1%-20% binder.

The cathode mix was rolled to 0.06 cm and dried in a vacuum oven. The cathode mass was approximately 0.1 g. The cathode and 0.075 cm thick lithium foil was cut using a 1.58 cm diameter (1.96 $cm^2$) hole punch. A 0.01 cm nonwoven glass separator was used for the separator and as a wick. The electrolyte used was 1 M $LiPF_6$ in proportional mixtures of dimethyl carbonate and ethylene carbonate. Other suitable electrolytes include, but are not limited to, lithium hexafluoroarsenate monohydrate ($LiAsF_6 \cdot H_2O$), lithium perchlorate ($LiClO_4$), lithium tetrafluoroborate ($LiBF_4$), and lithium triflate (c). The cells were cycled with an ARBIN Model MSTAT4 Battery Test System. The charge profile consisted of a constant current charge at 1.0 or 2.0 mA to 4.5 volts. The cells were discharged at 1.0, 2.0, 4.0, 6.0, 8.0, or 16.0 mA to 2.0, 2.25 or 3.0 or 3.5 volts. Additionally, pulse tests were performed upon discharge at 8.0 mA for 1 minute followed by a 3 minute rest. A rest period of 15 minutes between cycles allowed for the cells to equilibrate. Prior to cycling, cell impedance was recorded with a Solartron, SI1260 Frequency Response Analyzer with a Solartron, SI1287 Electrochemical Interface using Scribner Associates, Inc., ZPlot and ZView software. The data is used as a quality control tool and for comparative use between variant chemistries.

The data shows stable $Li_xMn_2O_{4-z}Cl_z$ or $Li_xMn_{2-y}Me_yO_{4-z}Cl_z$ with X mol % $MO_b$ or $MMn_aO_b$ (where M is Bi, As, or Sb) charge transfer catalyst coating was formulated, fabricated, and characterized as a positive electrode suitable for lithium and lithium ion rechargeable electrochemical cells and batteries. The general formula for the present spinel material is $Li_xMn_{2-y}Me_yO_{4-z}Cl_z$ with X mol % $MO_b$ or $MMn_aO_b$ where Me is Fe, Co, or Ni; M is Bi, As, or Sb; and X ranges from 0.5 to 25.0, 1 to 20, or 3 to 15. Moreover, x ranges from 0.05 to 1.9, 0.8 to 1.3, or 0.9 to 1.1; y ranges from 0.00 to 0.60, 0.005 to 0.3, or 0.03 to 0.3; and z ranges from 0.005 to 0.25, 0.005 to 0.05, or 0.015 to 0.035. In addition, a ranges from 0 to 10. Moreover, b ranges from 0 to 22, or b is greater than 0 but less than or equal to 22.

The rate capability of the $Li_xMn_2O_{4-z}Cl_z$ or $Li_xMn_{2-y}Me_yO_{4-z}Cl_z$ with X mol % $MO_b$ or $MMn_aO_b$ charge transfer catalyst coated cathode material is demonstrated with greater than 90% of specific discharge capacity through 200 cycles from 4.5 to 3.0 V at 8 $mA/cm^2$ (120 mA/g, with a C-rate of approximately 1C) and greater than 75% of specific discharge capacity through 140 cycles at 16 $mA/cm^2$ (240 mA/g, approximately 2C rate). The specific capacity for the $Li_xMn_2O_{4-z}Cl_z$ or $Li_xMn_{2-y}Me_yO_{4-z}Cl_z$ with X mol % $MO_b$ or $MMn_aO_b$ charge transfer catalyst coating cathode material ranged from 50 to 80 mAh/g when coupled with lithium and cycled between 4.5 and 3.0 volts. This is less than conventional lithium manganese-based $AB_2O_4$ spinel materials fabricated over a 48 to 72-hour time span due to the addition of the very heavy charge transfer catalyst materials. The specific capacity for the $Li_xMn_2O_{4-z}Cl_z$ or $Li_xMn_{2-y}Me_yO_{4-z}Cl_z$ with X mol % $MO_b$ or $MMn_aO_b$ charge transfer catalyst coating cathode material was 130 to 170 mAh/g when coupled with lithium and cycled between 4.5 and 2.0 volts. In the $MO_b$ or $MMn_aO_b$ coating, X ranges from 0.5 to 25, 1 to 20, or 3 to 15.

Figure 9:
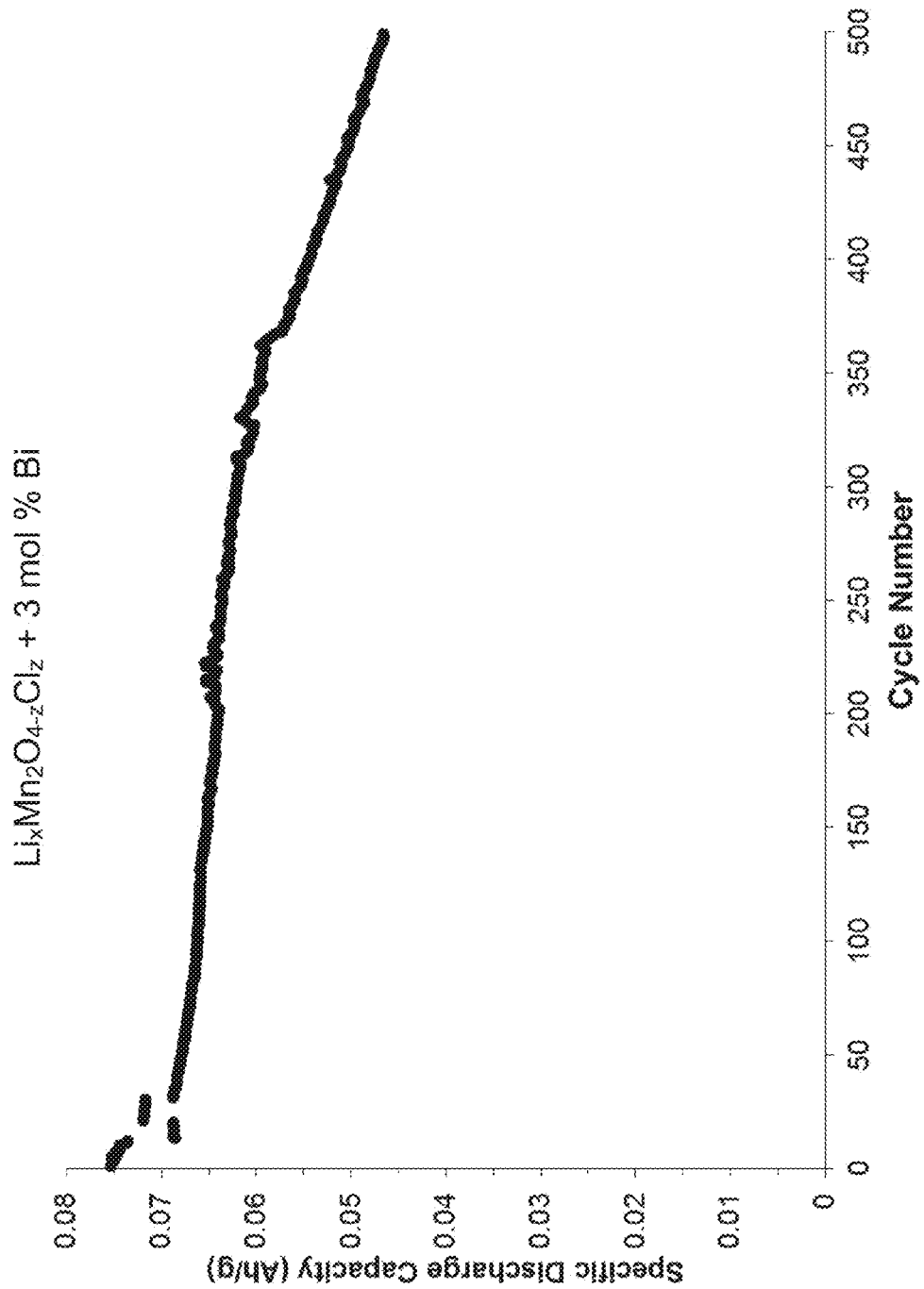
FIG. 9 is a graph illustrating specific discharge capacity over 500 cycles for a lithium cell containing a charge transfer catalyst coated "O" site modified lithium manganese-based $AB_2O_4$ spinel cathode material according to an exemplary embodiment of the present disclosure.
Figure 10:
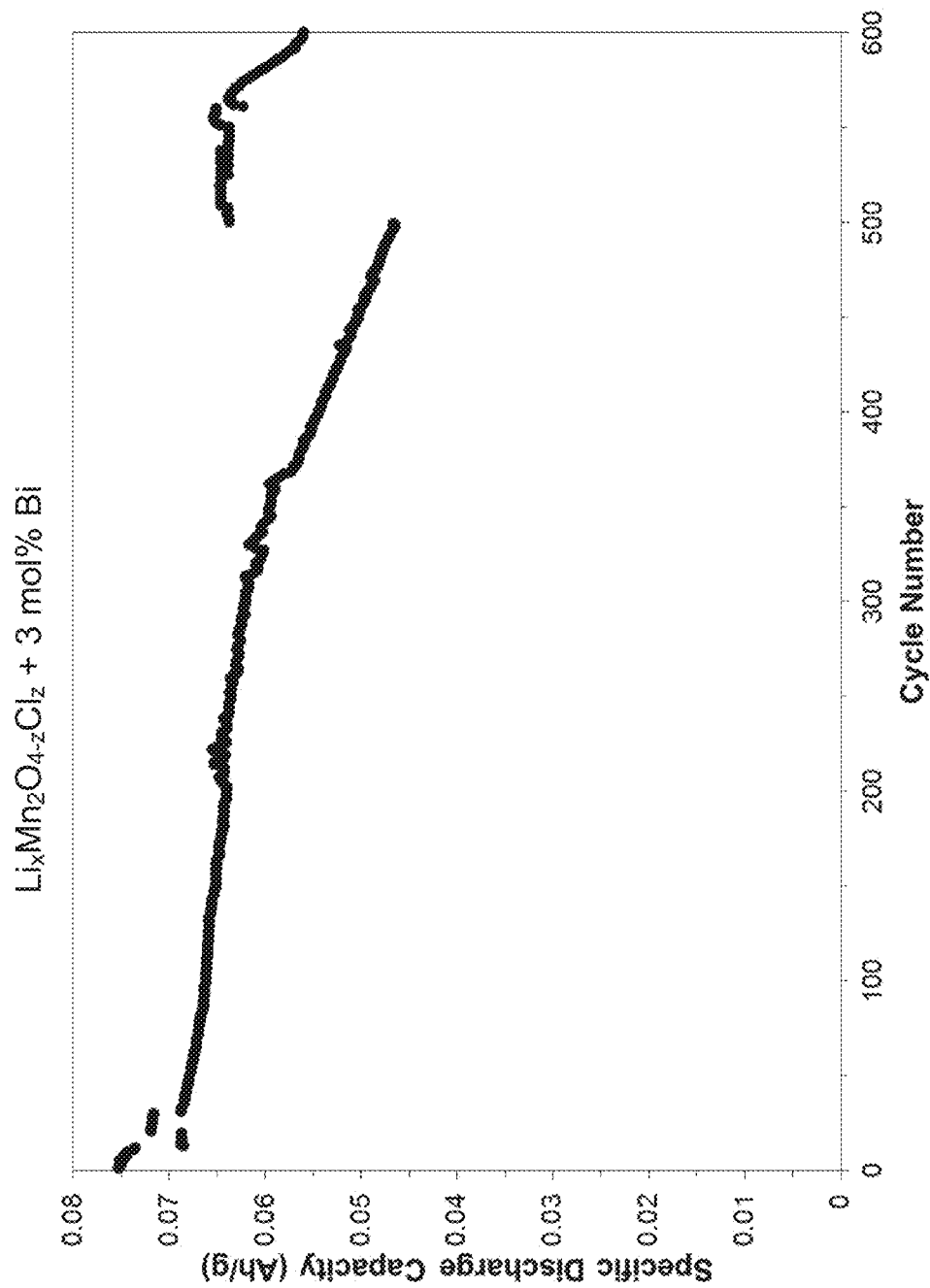
FIG. 10 is a graph showing discharge capacity over 600 cycles for a lithium cell containing a charge transfer catalyst coated "O" site modified lithium manganese-based $AB_2O_4$ spinel cathode material according to an exemplary embodiment of the present disclosure.
Figure 11:
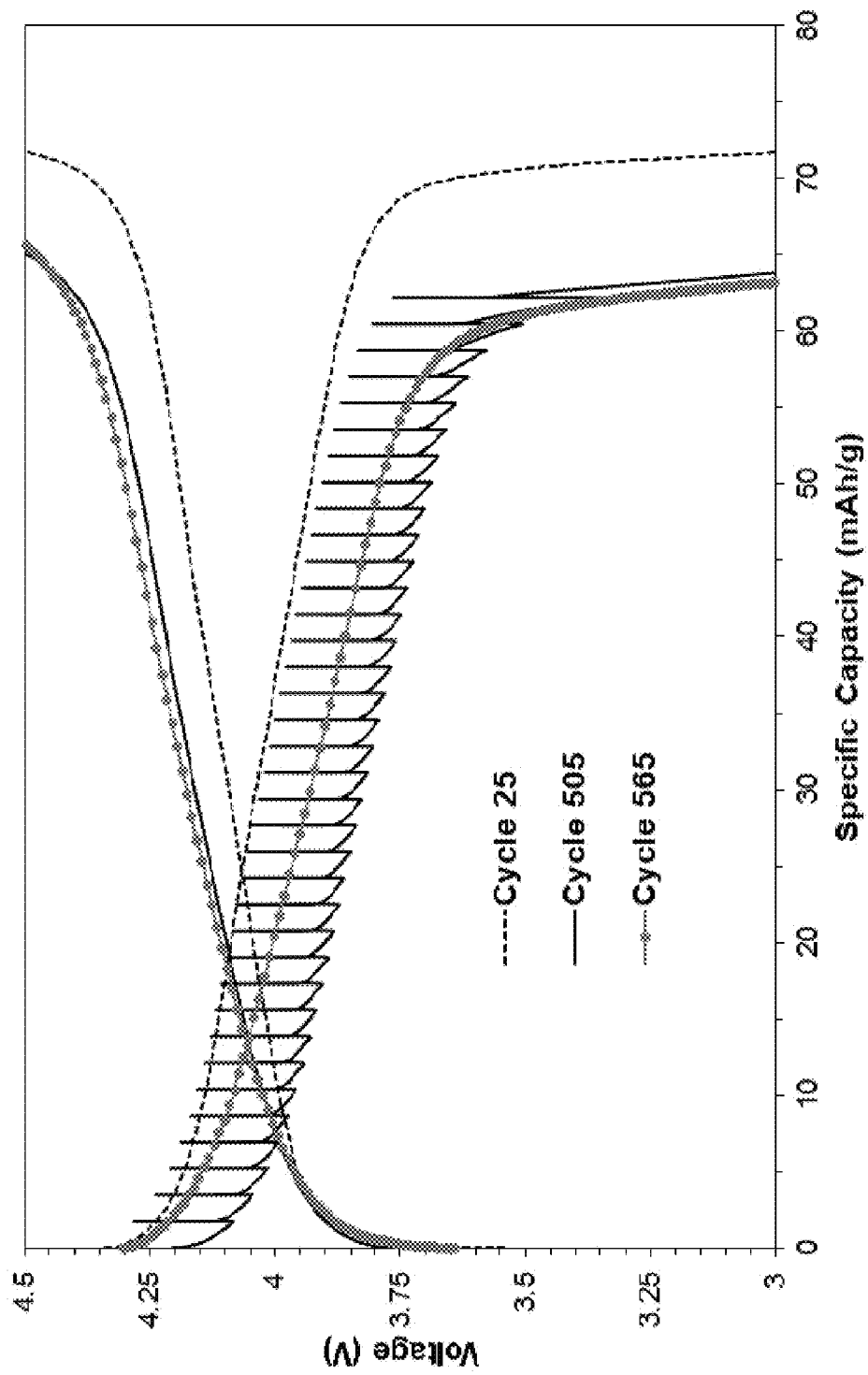
FIG. 11 is a graph illustrating the charge and discharge curves for cycles 25, 505, and 565 for a lithium cell containing a charge transfer catalyst coated "O" site modified lithium manganese-based $AB_2O_4$ spinel cathode material according to an exemplary embodiment of the present disclosure.

FIGS. 9-11 show discharge capacity and galvanostatic (charge/discharge) plots for lithium electrochemical cells fabricated with $Li_xMn_2O_{4-z}Cl_z$ with X mol % $MO_b$ or $MMn_aO_b$ charge transfer catalyst coating cathode material, synthesized using the method described in the present disclosure. In the exemplary plots shown in FIGS. 9-11, bismuth is the charge transfer catalyst coating on the modified lithium manganese-based $AB_2O_4$ spinel cathode material. The bismuth to manganese ratio in FIGS. 9-11 is 0.0379, or approximately 3 mol %.

FIGS. 9 and 10 show exemplary discharge capacities through 500 and 600 cycles, respectively, with select charge and discharge curves displayed in FIG. 11 for lithium electrochemical cells fabricated with $Li_xMn_2O_{4-z}Cl_z$ with X mol % $MO_b$ or $MMn_aO_b$ charge transfer catalyst coating cathode material, synthesized using the method described in the present disclosure. All cycles were cycled between 4.5 V to 3.0 V. Cycles 1-12 were charged and discharged at 1.1 $mA/cm^2$, cycles 13-20 were charged at 2 $mA/cm^2$ and discharged at 8 $mA/cm^2$, cycles 21-30 were charged and discharged at 2 $mA/cm^2$, cycles 31-500 were charged at 2 $mA/cm^2$ and discharged at 8 $mA/cm^2$, cycles 501-550 were charged at 2 $mA/cm^2$ and pulse discharged at 8 $mA/cm^2$ for 1 minute and rested for 3 minutes, and cycles 551-600 were charged and discharged at 2 $mA/cm^2$. Good capacity retention is demonstrated at extended cycling at a high rate, 8 $mA/cm^2$ (1C rate, 104 mA/g). FIG. 11 shows after extended cycling at a high rate, 90% of the discharge capacity can be recovered with pulse discharging at 8 $mA/cm^2$ for 1 minute and rest for 3 minutes at cycle 505, which is equivalent to the 2 $mA/cm^2$ discharge at cycle 565, as compared with the early cycling at the same 2 $mA/cm^2$ rate at cycle 25.

Figure 12:
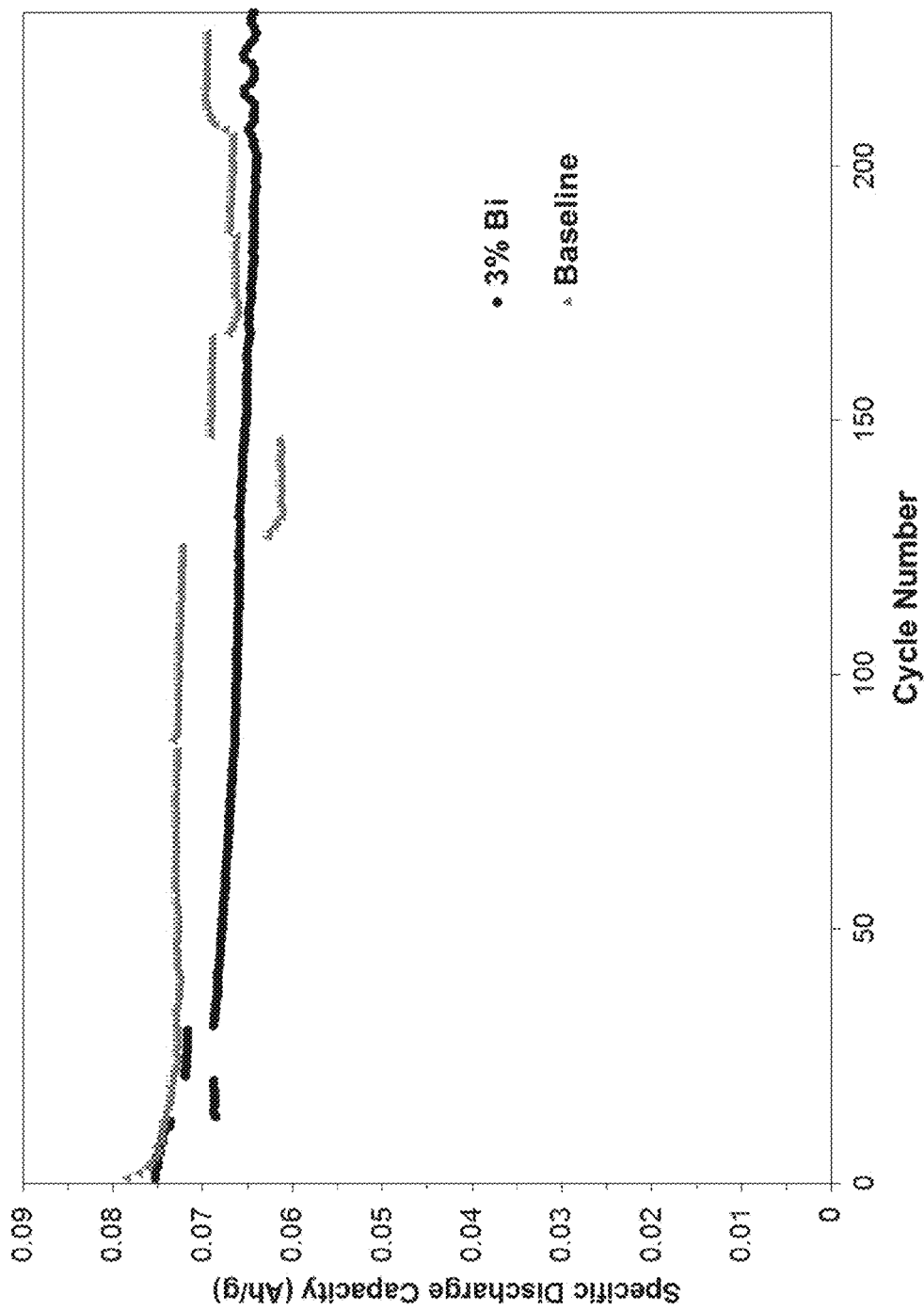
FIG. 12 is a graph showing discharge capacity to 225 cycles comparing two lithium cells, one containing a $Li_xMn_2O_4$ spinel and another containing a charge transfer catalyst coated "O" site modified lithium manganese-based $AB_2O_4$ spinel cathode material according to an exemplary embodiment of the present disclosure.

FIG. 12 shows the discharge capacity per cycle comparing two chemistries, one being $Li_xMn_2O_4$ synthesized using Steps S21-S23 without "B" or "O"-site modification before the addition of the charge transfer catalyst, and $Li_xMn_2O_{4-z}Cl_z$ with X mol % $MO_b$ or $MMn_aO_b$ charge transfer catalyst coating cathode material, synthesized using the method described in the present disclosure. In the exemplary plots shown in FIG. 12, bismuth is the charge transfer catalyst coating on the modified lithium manganese-based $AB_2O_4$ spinel cathode material. The bismuth to manganese ratio is 0.0379, or approximately 3 mol %. All cycles were cycled between 4.5 V to 3.0 V. The $Li_xMn_2O_4$ synthesized using Steps S21-S23 without "B" or "O"-site modification before the addition of the charge transfer catalyst was cycled at 1 mA/cm² for cycles 1-126, cycles 127-146 were charged at 2 mA/cm² and discharged at 8 mA/cm², cycles 147-166 were charged at 2 mA/cm² and discharged at 4 mA/cm², cycles 167-206 were charged at 2 mA/cm² and discharged at 6 mA/cm², and cycles 207-226 were charged and discharged at 2 mA/cm². The $Li_xMn_2O_{4-z}Cl_z$ with X mol % $MO_b$ or $MMn_aO_b$ charge transfer catalyst coating cathode material was charged and discharged at 1.1 mA/cm² for cycles 1-12, cycles 13-20 were charged at 2 mA/cm² and discharged at 8 mA/cm², cycles 21-30 were charged and discharged at 2 mA/cm², cycles 31-225 were charged at 2 mA/cm² and discharged at 8 mA/cm². The high rate capability with the addition of the charge transfer catalyst coating is demonstrated in FIG. 12 by the very small loss in discharge capacity from lower rates (1-2 mA/cm²) to the higher 8 mA/cm² rate for the $Li_xMn_2O_{4-z}Cl_z$ with X mol % $MO_b$ or $MMn_aO_b$ charge transfer catalyst coating cathode material versus a greater than 10% difference in discharge capacity for the $Li_xMn_2O_4$ synthesized using Steps S21-S23 without "B" or "O"-site modification before the addition of the charge transfer catalyst material.

Figure 13:
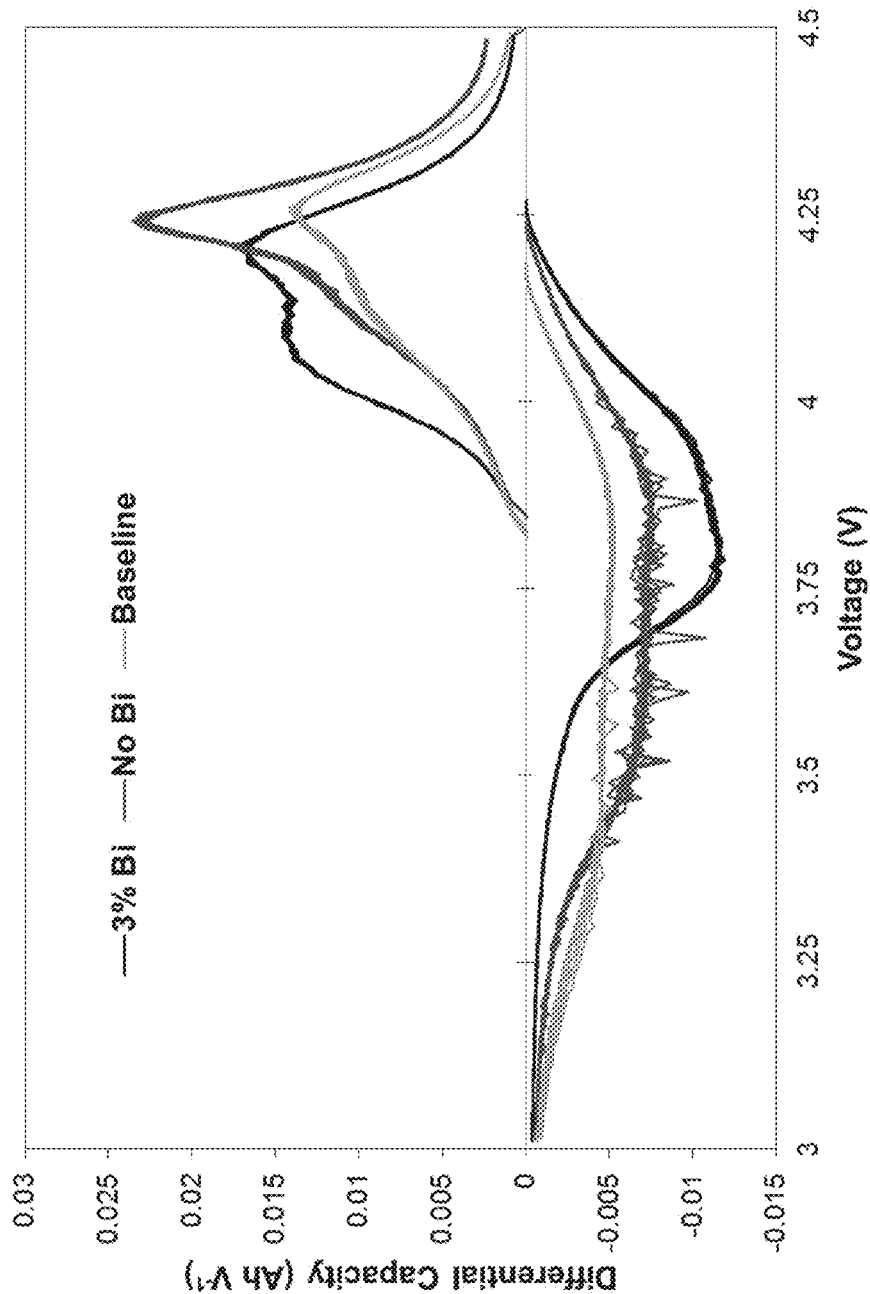
FIG. 13 is a graph of differential capacity comparing three lithium cells, one containing a $Li_xMn_2O_4$ spinel, another containing an "O" site modified lithium manganese-based $AB_2O_4$ spinel cathode material, and a third containing a charge transfer catalyst coated "O" site modified lithium manganese-based $AB_2O_4$ spinel cathode material according to an exemplary embodiment of the present disclosure.

FIG. 13 is a differential capacity graph of cycles 130 through 140 illustrating exemplary cycle life traces for three separate lithium cells, one being $Li_xMn_2O_{4-z}Cl_z$ synthesized using Steps S11-S13 before the addition of the charge transfer catalyst, one being $Li_xMn_2O_4$ synthesized using Steps S21-S23 without "B" or "O" site modification before the addition of the charge transfer catalyst, and $Li_xMn_2O_{4-z}Cl_z$ with X mol % $MO_b$ or $MMn_aO_b$ charge transfer catalyst coating cathode material, synthesized using the method described in the present disclosure. In the exemplary plot shown in FIG. 13, bismuth is the charge transfer catalyst coating on the modified lithium manganese-based $AB_2O_4$ spinel cathode material. The bismuth to manganese ratio is 0.03, or approximately 3 mol %. Differential capacity traces provide information regarding the underlying thermodynamics and kinetics of an electrochemical cell. The differential capacity data uses galvanostatic control of the electrochemical system being tested, and plots the capacity increase (charge) or decrease (discharge) as a function of potential. During cycles 130-140, all cells were cycled between 4.5 V to 3.0 V with a charge rate of 2 mA/cm² and discharge rate of 8 mA/cm². This figure shows that only with the addition of the charge transfer catalyst coating is the electrochemistry more reversible (corresponding peaks are closer together) and the electrochemical activity is completed faster, almost entirely before 3.5 V upon discharge as shown by the narrower peaks.

Figure 14:
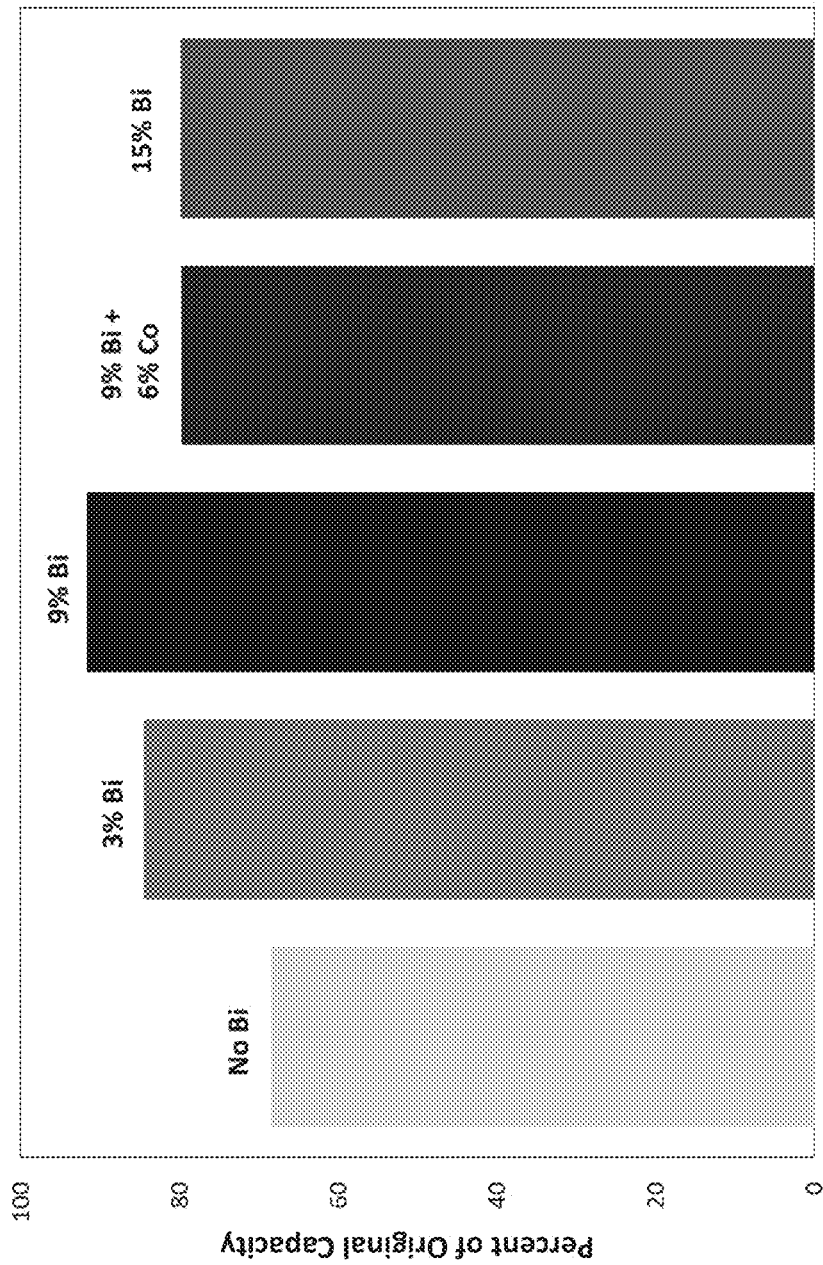
FIG. 14 is a bar graph illustrating the percent of original discharge capacity at cycle 150 versus cycle 5 for five different lithium cells, one containing an "O" site modified lithium manganese-based $AB_2O_4$ spinel cathode material, one containing $Li_xMn_{2-y}Me_yO_{4-z}Cl_z$, where Me is Fe, Co, or Ni, with X mol % $MO_b$ or $MMn_aO_b$ coating cathode material according to an exemplary embodiment of the present disclosure, and the other three containing a charge transfer catalyst coated "O" site modified lithium manganese-based $AB_2O_4$ spinel cathode material according to an exemplary embodiment of the present disclosure.

FIG. 14 is a bar graph of the percent of discharge capacity at cycle 150 discharged from 4.5 to 3.0 V at 8 mA/cm² versus cycle 5 discharged at 1 (9 mol % Bi) mA/cm² or 2 mA/cm² (no Bi, 3 mol % Bi, 9 mol % Bi with 6% Co, and 15 mol % Bi) for five separate chemistries, one being $Li_xMn_2O_{4-z}Cl_z$ synthesized using Steps S11-S13 before the addition of the charge transfer catalyst, and four different $Li_xMn_{2-y}Me_yO_{4-z}Cl_z$ with X mol % $MO_b$ or $MMn_aO_b$ charge transfer catalyst coating cathode materials, synthesized using the method described in the present disclosure. In the exemplary plot shown in FIG. 14, bismuth is the charge transfer catalyst coating on the modified lithium manganese-based $AB_2O_4$ spinel cathode material and one embodiment includes Me=Co, where y=0.06. The bismuth to manganese ratio is 0.0379, 0.0959, 0.0848, 0.149 or approximately 3, 9, 8, and 15 mol %. The high rate capability is demonstrated in all four charge transfer catalyst embodiments showing approximately 80% capacity retention or greater for an 8 mA/cm² discharge at extended cycling compared to less than 70% capacity retention for the same synthesis only without the addition of the charge transfer coating described in Steps S14-18 of FIG. 1 and Steps S24-28 of FIG. 2.

Figure 15:
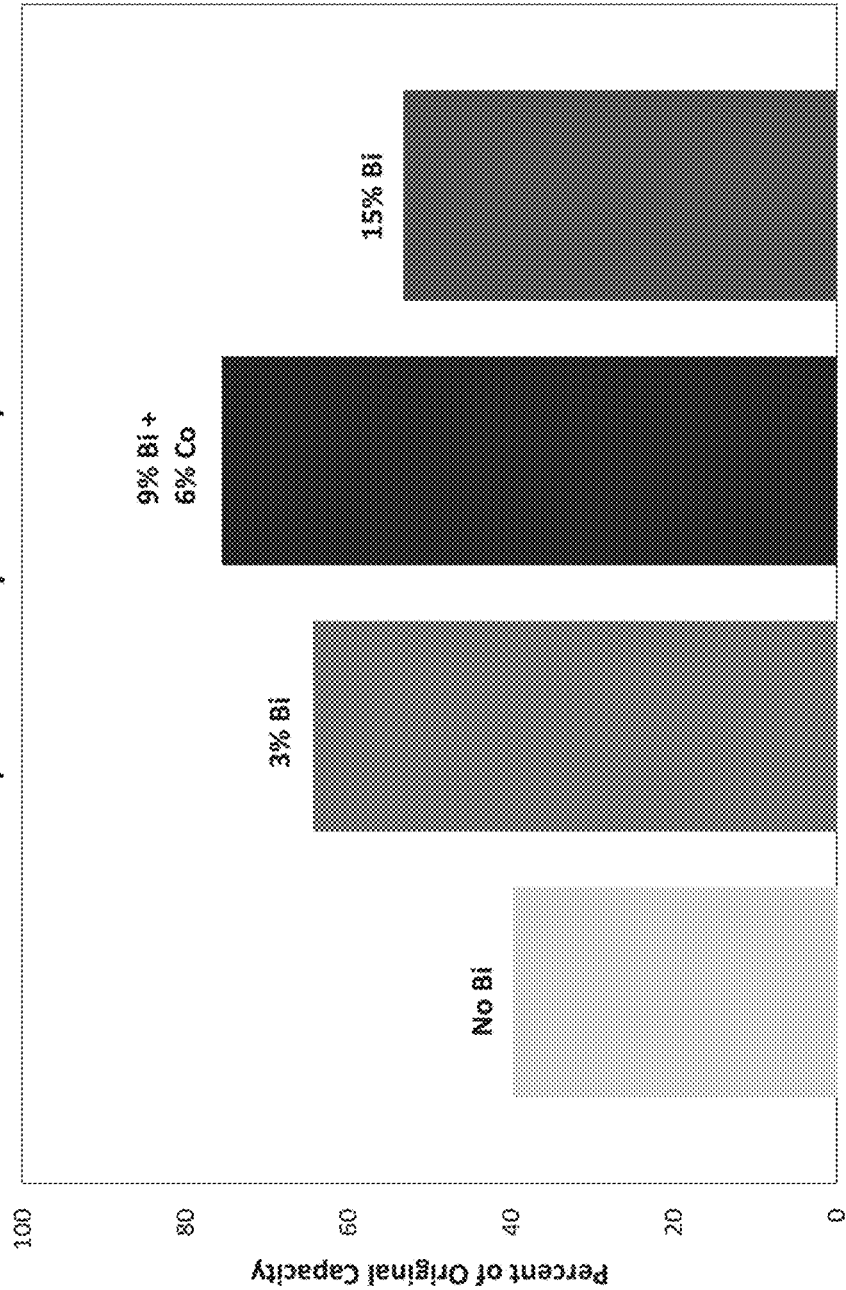
FIG. 15 is a bar graph illustrating the percent of original discharge capacity at cycle 140 versus cycle 5 for four different lithium cells, each containing varying mole percentages of the $MO_b$ or $MMn_aO_b$ coating.

FIG. 15 is a bar graph of the percent of discharge capacity at cycle 140 discharged from 4.5 to 3.0 V at 16 mA/cm² versus cycle 5 discharged 2 mA/cm² for four separate embodiments, one being $Li_xMn_2O_{4-z}Cl_z$ synthesized using Steps S11-S13 before the addition of the charge transfer catalyst, and three different $Li_xMn_{2-y}Me_yO_{4-z}Cl_z$ with X mol % $MO_b$ or $MMn_aO_b$ charge transfer catalyst coating cathode materials, synthesized using the method described in the present disclosure. In the exemplary plot shown in FIG. 15, bismuth is the charge transfer catalyst coating on the modified lithium manganese-based $AB_2O_4$ spinel cathode material and in one embodiment, Me is cobalt and y=0.06. The bismuth to manganese ratio is 0.0379, 0.0848, 0.149 or approximately 3, 9, and 15 mol %. The high rate capability is demonstrated in all three charge transfer catalyst chemistries showing approximately 52-75% capacity retention for a 16 mA/cm² discharge at extended cycling compared to less than 40% capacity retention for the same synthesis only without the addition of the charge transfer coating described in Steps S14-18 of FIG. 1 and Steps S24-28 of FIG. 2.

Figure 16:
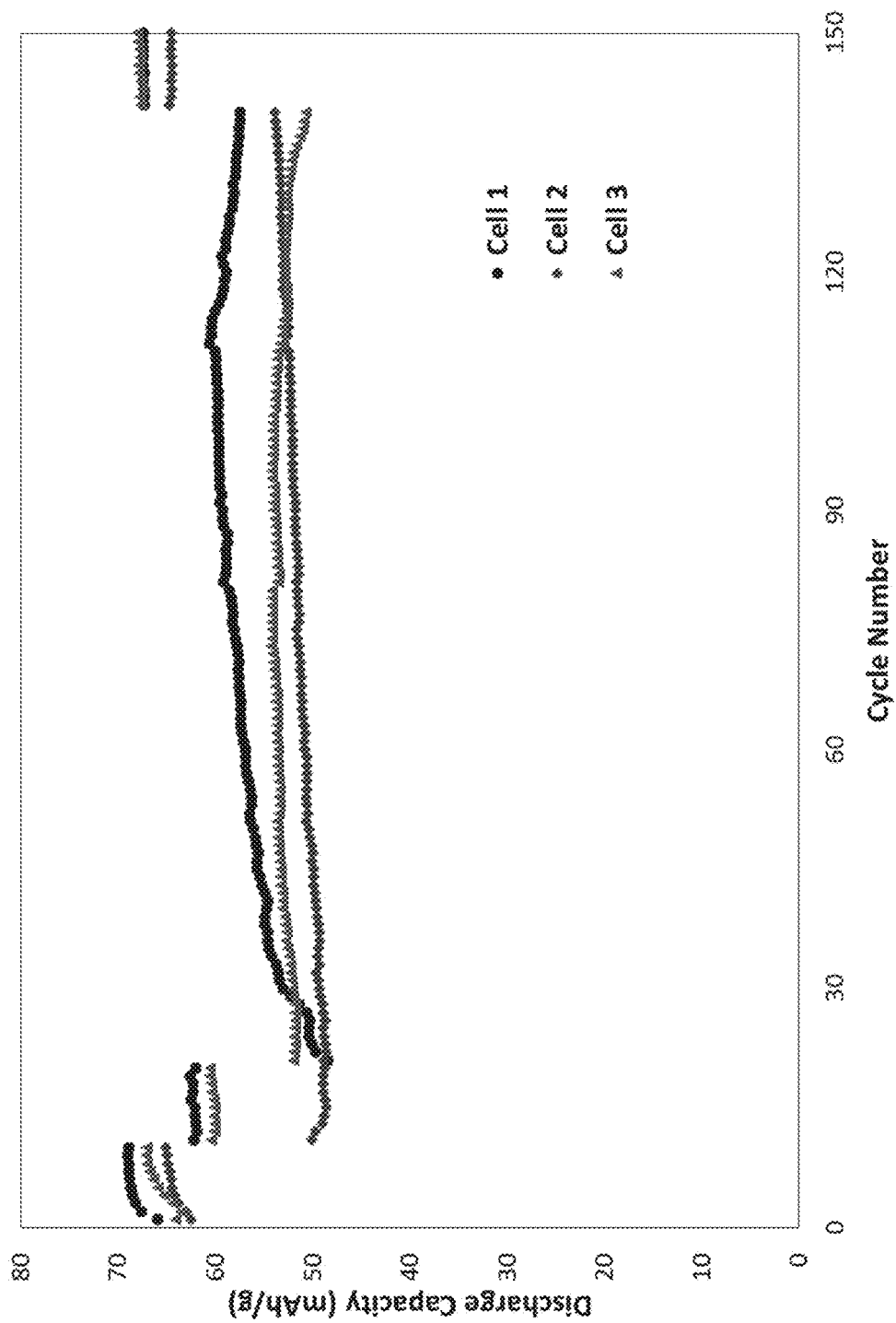
FIG. 16 is a graph showing the discharge capacity over 150 cycles for three lithium cells of the same chemistry containing $Li_xMn_{2-y}Me_yO_{4-z}Cl_z$, where Me is Fe, Co, or Ni, with X mol % $MO_b$ or $MMn_aO_b$ coating cathode material according to an exemplary embodiment of the present disclosure.
Figure 17:
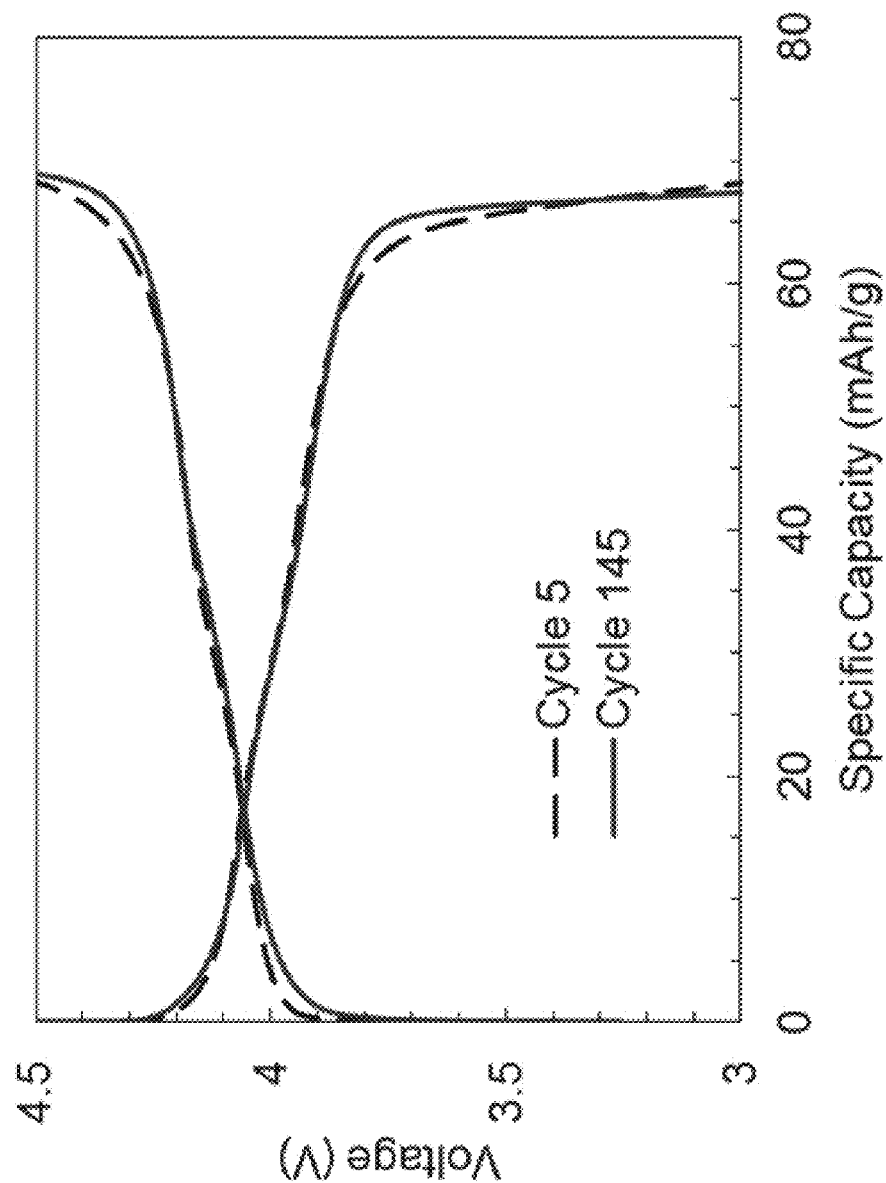
FIG. 17 is a graph illustrating the charge/discharge curve comparison between cycle 5 and cycle 145 for lithium cell 1 containing $Li_xMn_{2-y}Me_yO_{4-z}Cl_z$, where Me is Fe, Co, or Ni, with X mol % $MO_b$ or $MMn_aO_b$ coating cathode material according to an exemplary embodiment of the present disclosure.
Figure 18:
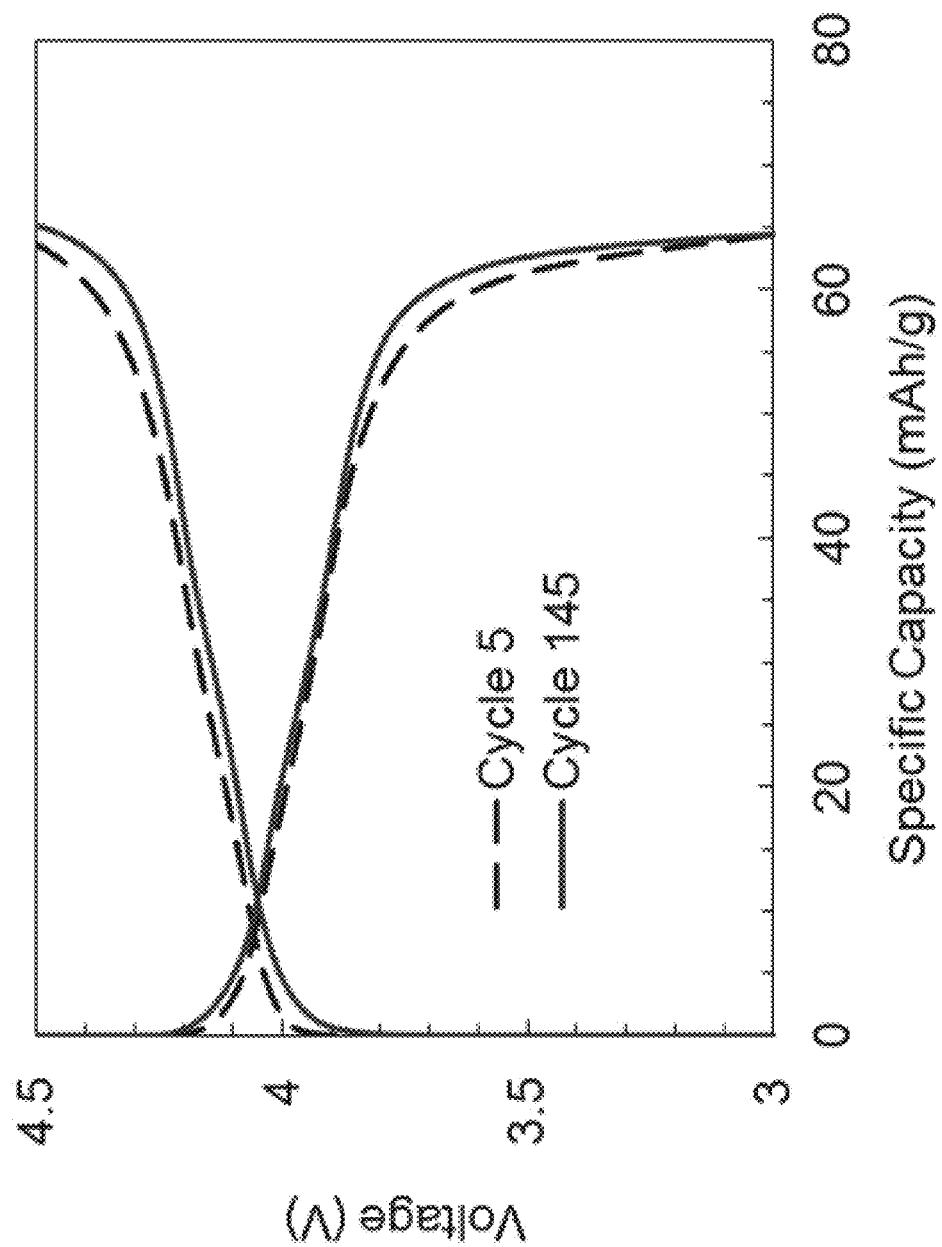
FIG. 18 is a graph illustrating the charge/discharge curve comparison between cycle 5 and cycle 145 for lithium cell 2 containing $Li_xMn_{2-y}Me_yO_{4-z}Cl_z$, where Me is Fe, Co, or Ni, with X mol % $MO_b$ or $MMn_aO_b$ coating cathode material according to an exemplary embodiment of the present disclosure.
Figure 19:
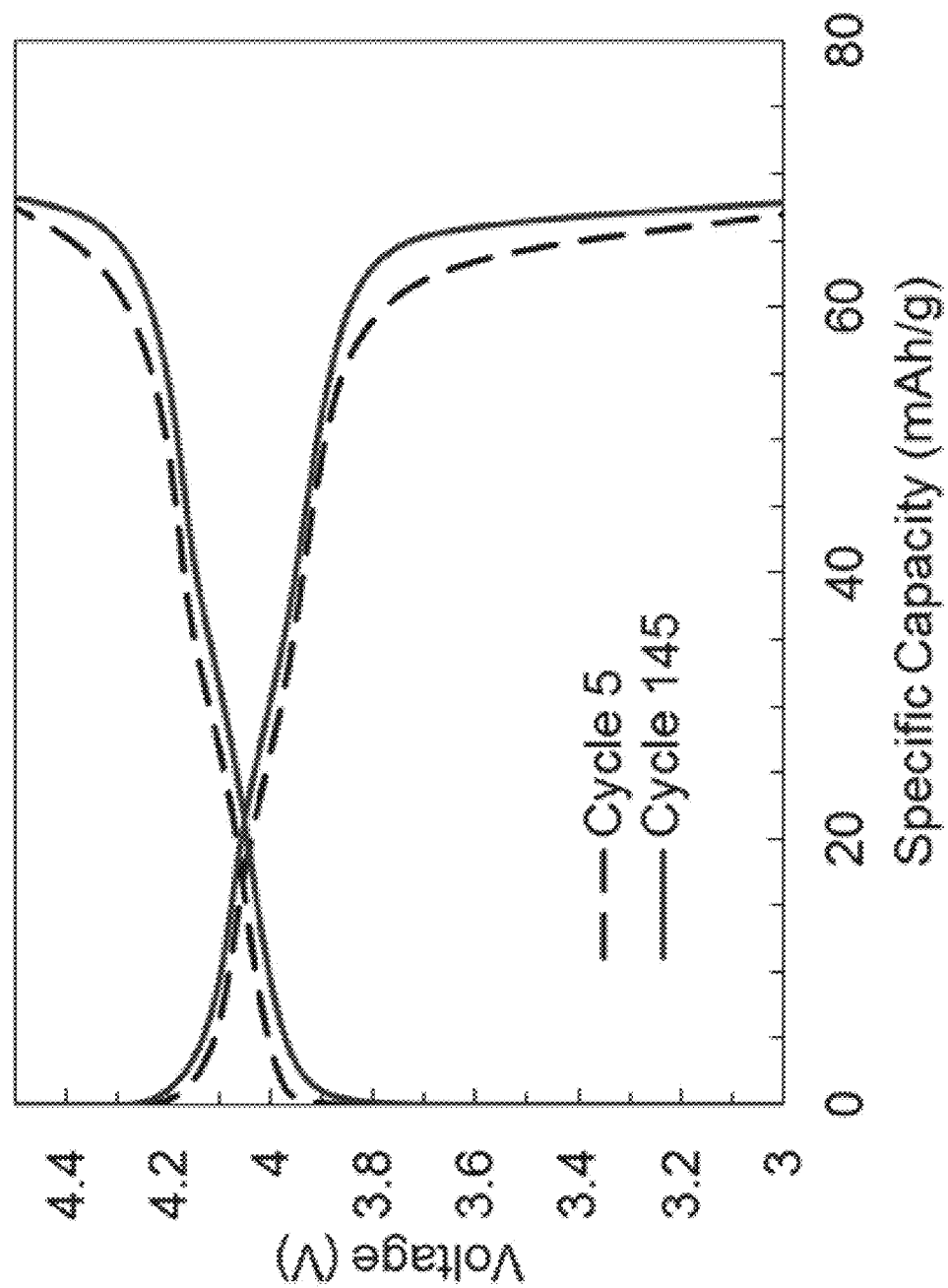
FIG. 19 is a graph illustrating the charge/discharge curve comparison between cycle 5 and cycle 145 for lithium cell 3 containing $Li_xMn_{2-y}Me_yO_{4-z}Cl_z$, where Me is Fe, Co, or Ni, with X mol % $MO_b$ or $MMn_aO_b$ coating cathode material according to an exemplary embodiment of the present disclosure.

FIGS. 16-19 show discharge capacity per cycle and the galvanostatic charge/discharge cycle plots for 3 exemplary electrochemical cells with $Li_xMn_{2-y}Me_yO_{4-z}Cl_z$ with X mol % $MO_b$ or $MMn_aO_b$ charge transfer catalyst coating cathode material, synthesized using the method described in the present disclosure. In the exemplary plots shown in FIGS. 16-19, bismuth is the charge transfer catalyst coating on the modified lithium manganese-based $AB_2O_4$ spinel cathode material and cobalt is the "B" site modifier where y=0.06. The bismuth to manganese ratio is 0.0848, or approximately 9 mol %. The cells were cycled from 4.5V to 3.0V. Cell 1 was charged and discharged at 1 mA/cm² for cycles 1-10, cycles 11-20 were charged at 2 mA/cm² and discharged at 4 mA/cm², cycles 21-140 were charged at 4 mA/cm² and discharged at 8 mA/cm², and cycles 141-150 were charged and discharged at 2 mA/cm². Cell 2 was charged and discharged at 2 mA/cm² for cycles 1-10, cycles 11-140 were charged at 2 mA/cm² and discharged at 8 mA/cm², and cycles 141-150 were charged and discharged at 2 mA/cm². Cell 3 was charged and discharged at 2 mA/cm² for cycles 1-10, cycles 11-20 were charged at 2 mA/cm² and discharged at 8 mA/cm², cycles 21-140 were charged at 2 mA/cm² and discharged at 16 mA/cm², and cycles 141-150 were charged and discharged at 2 mA/cm². In FIG. 16, cell 3 shows excellent capacity retention at the very high 16 mA/cm² discharge rate (2C, 234 mA/g) over cycles 21-140. This comports with the 8 mA/cm² discharge rate capacities of the other two cells across the same cycle region. In FIGS. 17-19, the charge and discharge curves for the 2 mA/cm² cycling at cycle 145 and cycle 5 are nearly identical after extended cycling at high rates for all three cells. FIG. 19 shows how quickly the electrochemistry can be performed at the very high 16 mA/cm² discharge rate capacity, with essentially no damage to the crystal before and after the high rate cycling in the charge transfer catalyst coated $AB_2O_4$ spinel material.

Figure 20:
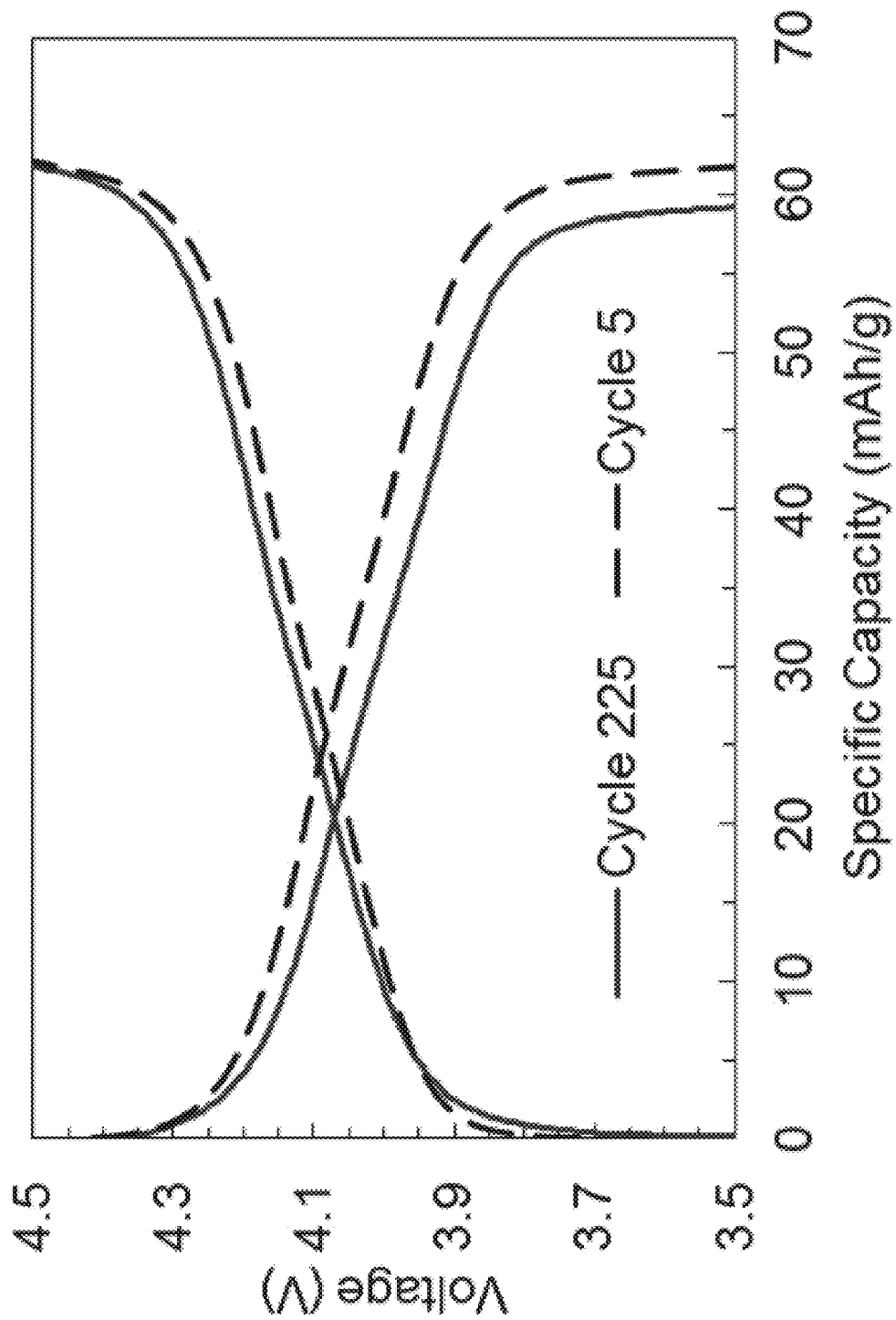
FIG. 20 is a graph illustrating the charge/discharge curve comparison between cycle 5 and cycle 220 for lithium cell 4 containing a charge transfer catalyst coated "O" site modified lithium manganese-based $AB_2O_4$ spinel cathode material according to an exemplary embodiment of the present disclosure.
Figure 21:
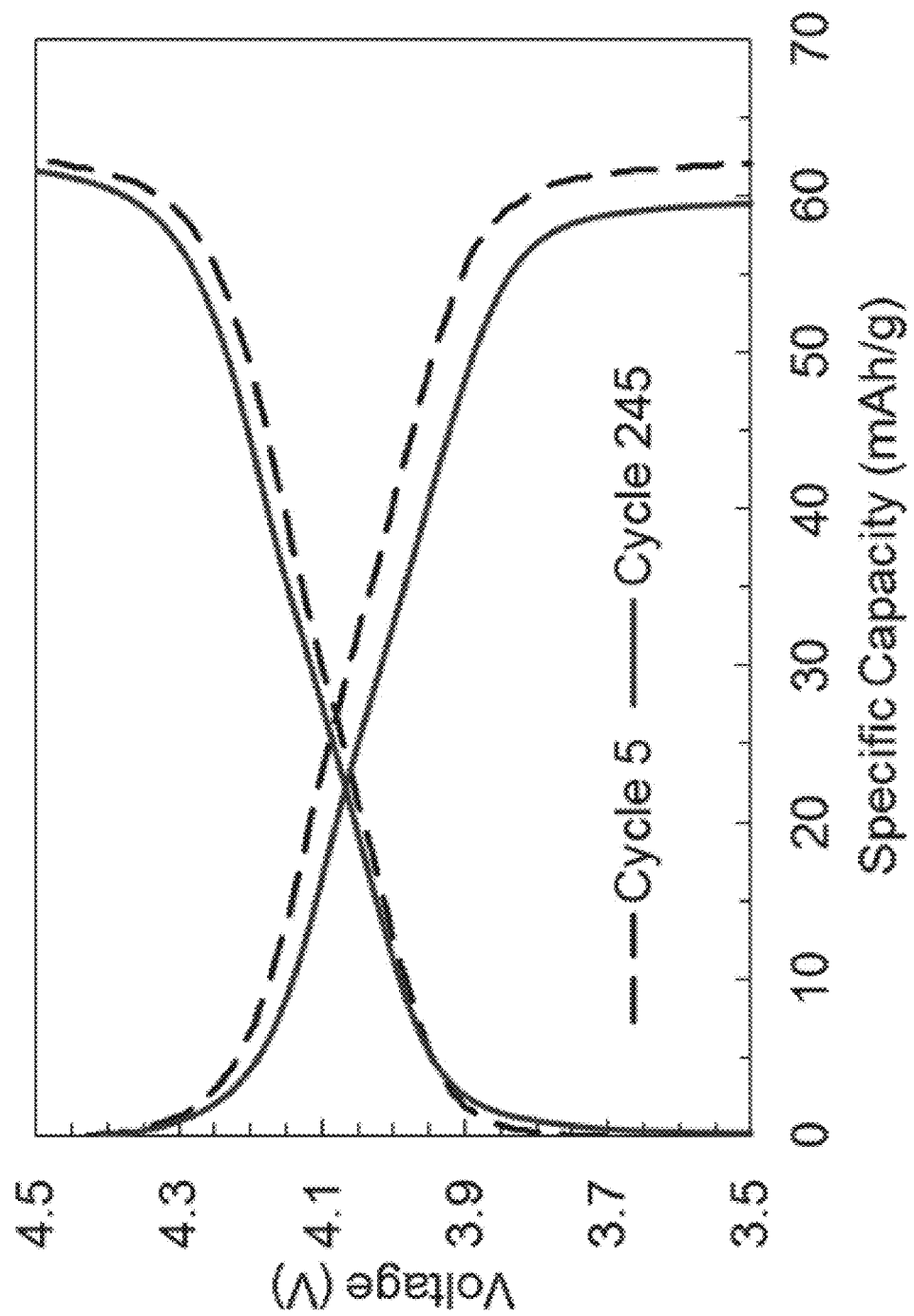
FIG. 21 is a graph illustrating the charge/discharge curve comparison between cycle 5 and cycle 220 for lithium cell 5 containing a charge transfer catalyst coated "O" site modified lithium manganese-based $AB_2O_4$ spinel cathode material according to an exemplary embodiment of the present disclosure.
Figure 22:
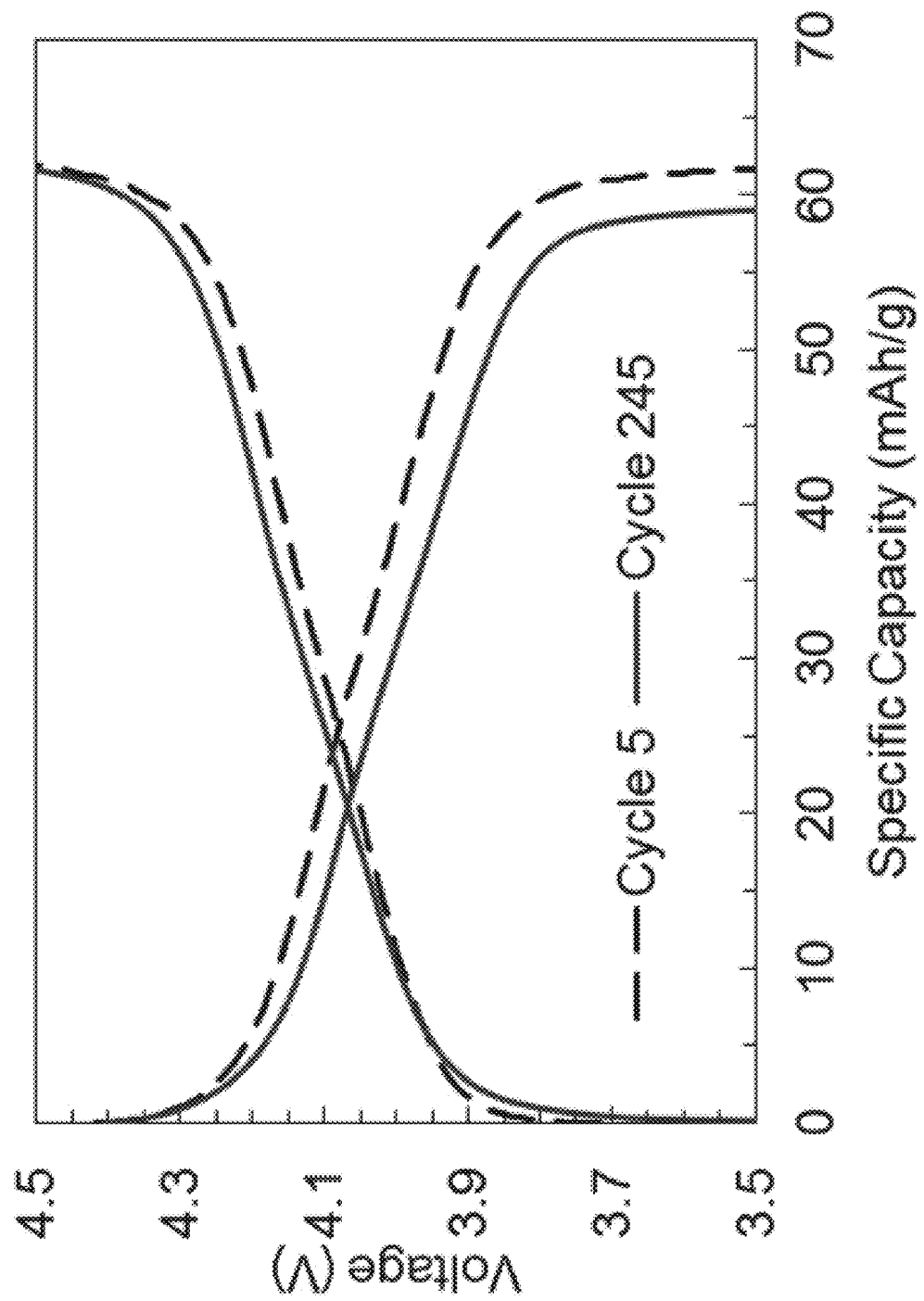
FIG. 22 is a graph illustrating the charge/discharge curve comparison between cycle 5 and cycle 220 for lithium cell 6 containing a charge transfer catalyst coated "O" site modified lithium manganese-based $AB_2O_4$ spinel cathode material according to an exemplary embodiment of the present disclosure.

FIGS. 20-22 show the galvanostatic charge/discharge cycle plots for 3 exemplary electrochemical cells with $Li_xMn_2O_{4-z}Cl_z$ with X mol % $MO_b$ or $MMn_aO_b$ charge transfer catalyst coating cathode material, synthesized using the method described in the present disclosure. In the exemplary plots shown in FIGS. 20-22, bismuth is the charge transfer catalyst coating on the modified lithium manganese-based $AB_2O_4$ spinel cathode material. The bismuth to manganese ratio is 0.149, or approximately 15 mol %. All cells were cycled from 4.5 to 3.0 V. Cell 4 was charged and discharged at 1 $mA/cm^2$ for cycles 1-10, cycles 11-19 were charged at 2 $mA/cm^2$ and discharged at 4 $mA/cm^2$, cycles 20-39 were charged at 2 $mA/cm^2$ and discharged at 16 $mA/cm^2$, cycles 40-221 were charged at 2 $mA/cm^2$ and discharged at 8 $mA/cm^2$, and cycles 222-231 were charged and discharged at 1 $mA/cm^2$. Cell 5 was charged and discharged at 1 $mA/cm^2$ for cycles 1-10, cycles 11-21 were charged at 2 $mA/cm^2$ and discharged at 4 $mA/cm^2$, cycles 22-31 were charged at 2 $mA/cm^2$ and discharged at 8 $mA/cm^2$, cycles 32-241 were charged at 4 $mA/cm^2$ and discharged at 8 $mA/cm^2$, and cycles 242-251 were charged and discharged at 1 $mA/cm^2$. Cell 6 was charged and discharged at 1 $mA/cm^2$ for cycles 1-10, cycles 11-22 were charged at 2 $mA/cm^2$ and discharged at 8 $mA/cm^2$, cycles 23-242 were charged at 2 $mA/cm^2$ and discharged at 16 $mA/cm^2$, and cycles 243-252 were charged and discharged at 1 $mA/cm^2$. FIGS. 20-22 demonstrate reasonable capacity retention at 1 $mA/cm^2$ after greater than 200 cycles at high rates (16 and 8 $mA/cm^2$) due to the addition of the charge transfer catalyst coating on the $AB_2O_4$ spinel material.

Figure 23:
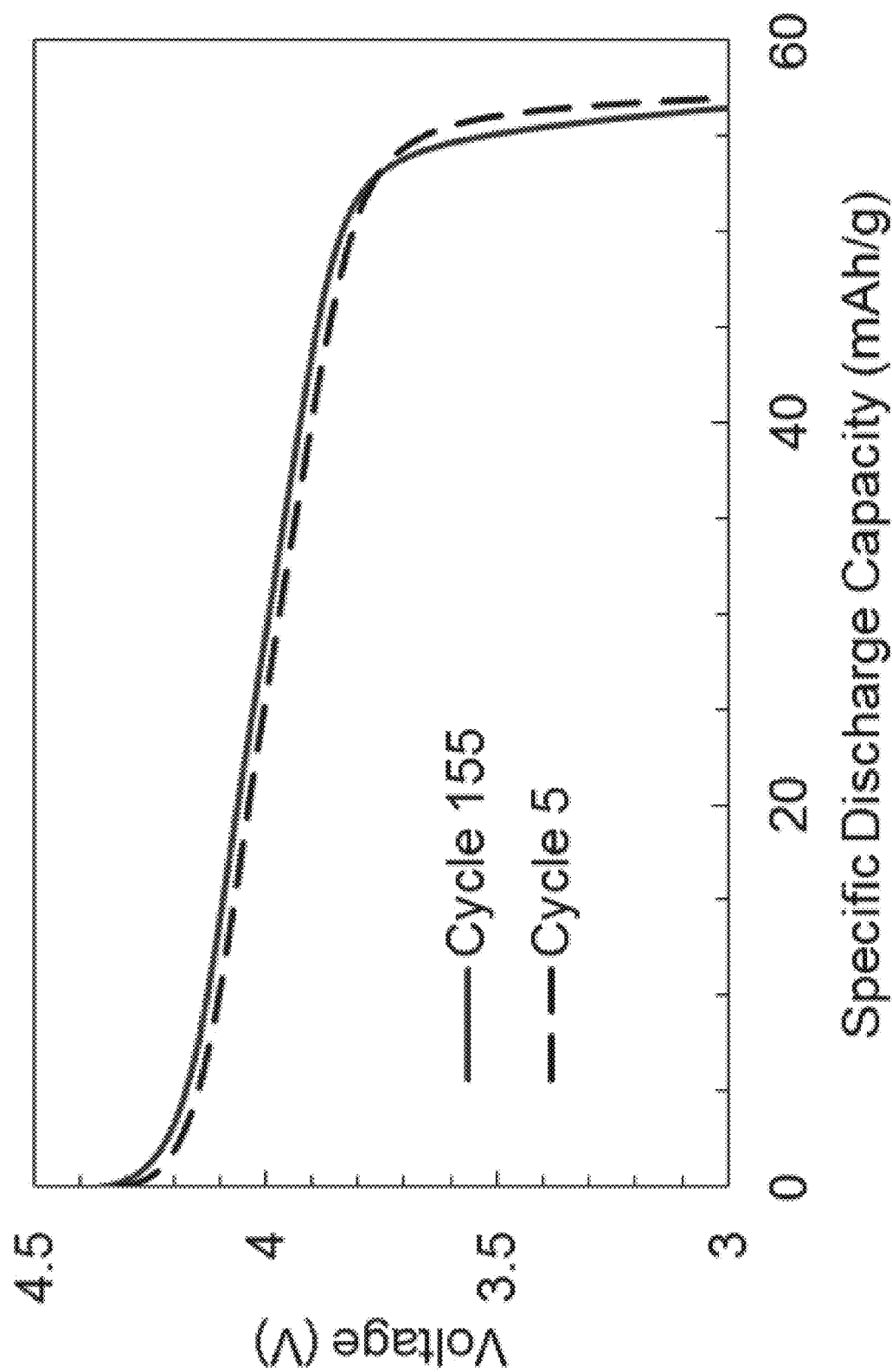
FIG. 23 is a graph illustrating the discharge curve comparison between cycle 5 and cycle 155 for a lithium cell containing a charge transfer catalyst coated "O" site modified lithium manganese-based $AB_2O_4$ spinel cathode material according to an exemplary embodiment of the present disclosure.
Figure 24:
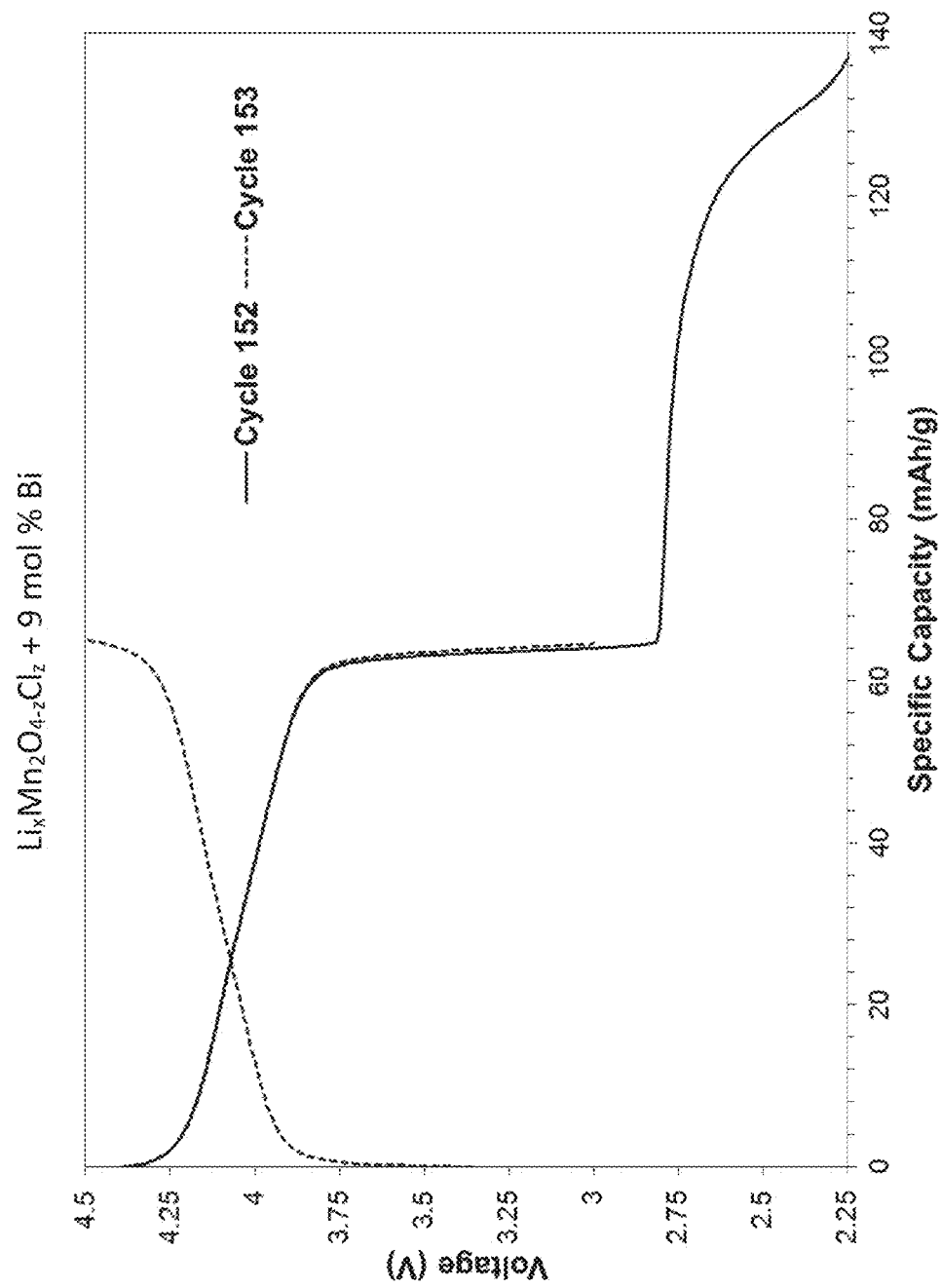
FIG. 24 is a graph illustrating the discharge/charge/discharge curve for cycle 152 and cycle 153 for a lithium cell containing a charge transfer catalyst coated "O" site modified lithium manganese-based $AB_2O_4$ spinel cathode material according to an exemplary embodiment of the present disclosure.

FIGS. 23 and 24 show galvanostatic charge and discharge curves for an exemplary electrochemical cell with $Li_xMn_2O_{4-z}Cl_z$ with X mol % $MO_b$ or $MMn_aO_b$ charge transfer catalyst coating cathode material, synthesized using the method described in the present disclosure. In these figures, bismuth is the charge transfer catalyst coating on the modified lithium manganese-based $AB_2O_4$ spinel cathode material. The bismuth to manganese ratio is 0.0959, or approximately 9 mol %. The cell was cycled from 4.5 V to 3.0 V from cycles 1 through 150. The charge and discharge rate for cycles 1-10 was 2 $mA/cm^2$, cycles 11-150 were charged at 2 $mA/cm^2$ and discharged at 8 $mA/cm^2$. For cycles 151 to 162, the charge and discharge rates were 2 $mA/cm^2$, but the discharge potential oscillated back and forth from 3.0 V to 2.25 V to access the second lithium insertion. In FIG. 23, the high rate capability is demonstrated by negligible loss of capacity between the 2 $mA/cm^2$ discharges at cycles 155 and 5 after the long cycling at elevated discharge rate 8 $mA/cm^2$. In FIG. 24, the deep discharge to 2.25 V is shown achieving twice the capacity achieved in the 4.5 to 3.0 V discharge. This figure demonstrates that the charge transfer catalyst coated spinel material exhibits deep discharge capability as a result of the "O" site chlorine modifications through the continued charge and discharge in cycle 153, and the cycles up to 155, as shown in FIG. 23.

Figure 25:
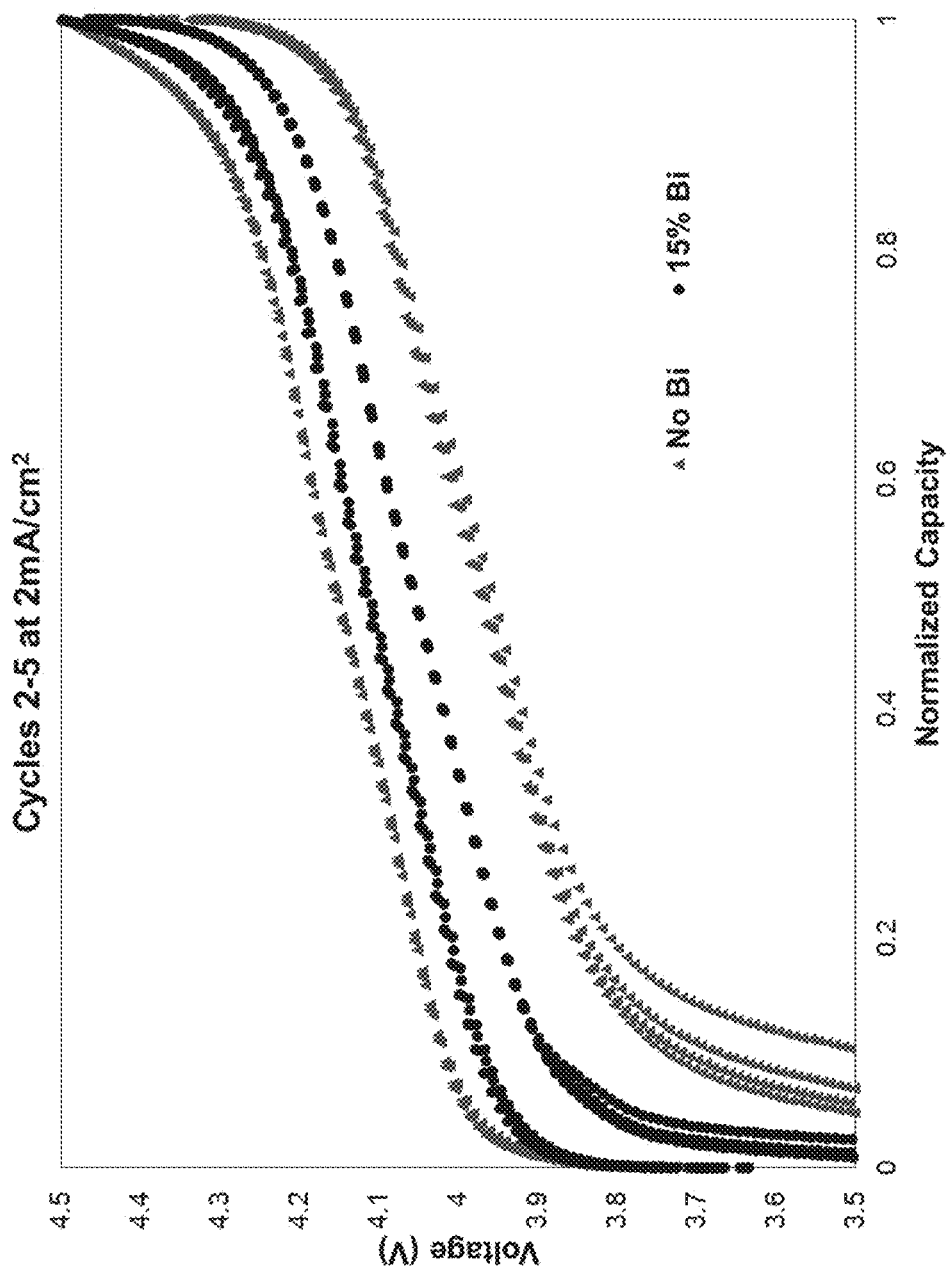
FIG. 25 is a graph showing the comparison of hysteresis upon charge and discharge of two lithium cells, one containing an "O" site modified lithium manganese-based $AB_2O_4$ spinel cathode material, and another containing a charge transfer catalyst coated "O" site modified lithium manganese-based $AB_2O_4$ spinel cathode material according to an exemplary embodiment of the present disclosure.
Figure 26:
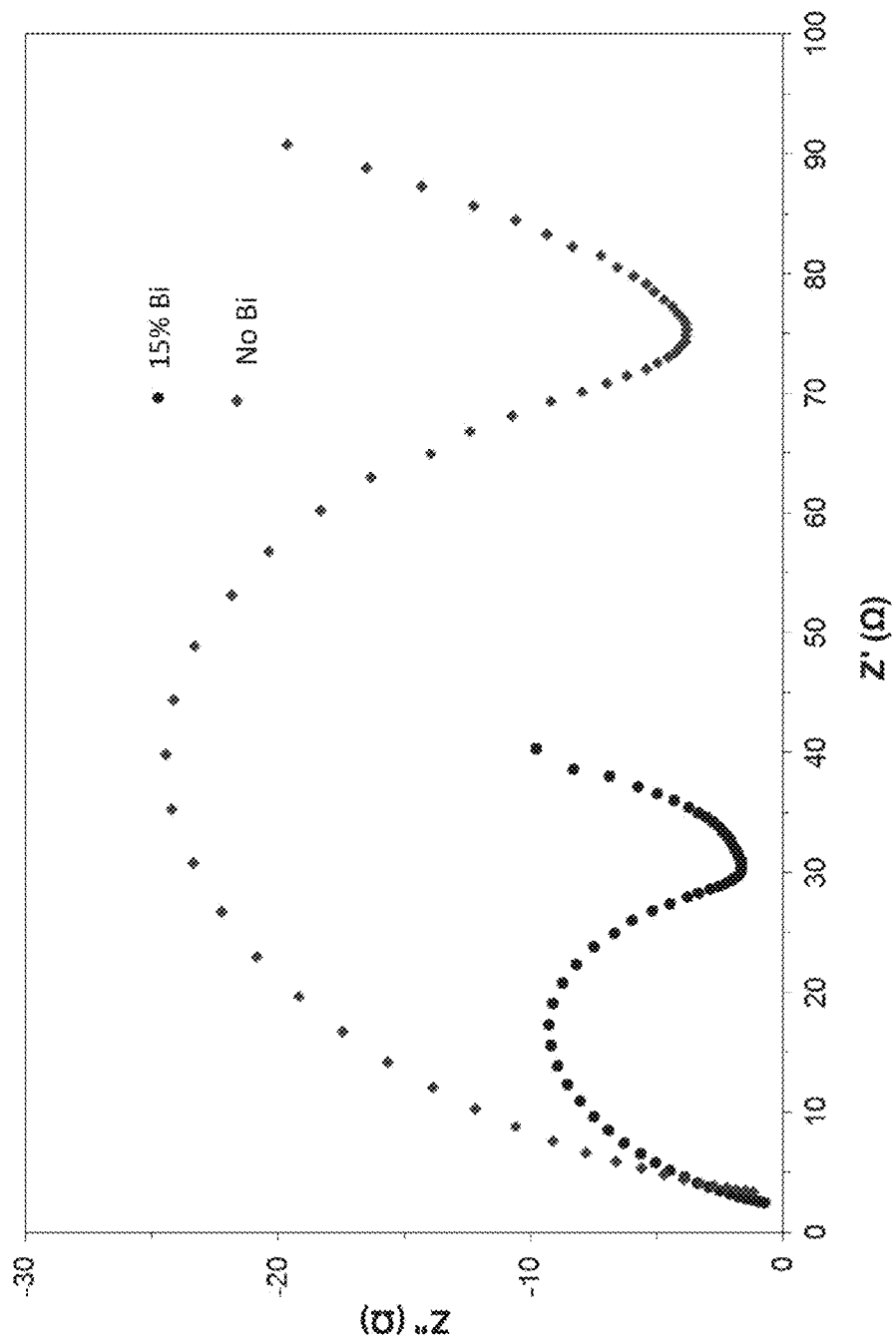
FIG. 26 is a graph showing the comparison of electrochemical impedance spectroscopy (EIS) of two lithium cells, one containing an "O" site modified lithium manganese-based $AB_2O_4$ spinel cathode material, and another containing a charge transfer catalyst coated "O" site modified lithium manganese-based $AB_2O_4$ spinel cathode material according to an exemplary embodiment of the present disclosure.

FIGS. 25 and 26 are charge/discharge hysteresis and electrochemical impedance spectroscopy (EIS) plots comparing two chemistries, one with $Li_xMn_2O_{4-z}Cl_z$ synthesized using Steps S11-S13 before the addition of the charge transfer catalyst, and another with $Li_xMn_2O_{4-z}Cl_z$ with X mol % $MO_b$ or $MMn_aO_b$ charge transfer catalyst coating cathode material, synthesized using the method described in the present disclosure. In these figures, bismuth is the charge transfer catalyst coating on the modified lithium manganese-based $AB_2O_4$ spinel cathode material. The bismuth to manganese ratio is 0.149, or approximately 15 mol %. In FIG. 25, the first four cycles after the forming cycle (2-5) from 4.5 to 3.0 V with a charge/discharge rate of 2 $mA/cm^2$ are displayed against a normalized capacity for comparison purposes. The material containing the bismuth charge transfer catalyst coating shows a far smaller hysteresis in cycling, indicating faster kinetics during electrochemical cycling. FIG. 26 is the electrochemical impedance measured at 3.6 V of open circuit voltage immediately following cell fabrication. This figure supports the enhanced kinetic properties of the bismuth charge transfer coating by demonstrating a far smaller charge transfer resistance upon cell fabrication.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A method of preparing a coated homogeneously dispersed $Li_xMn_{2-y}Me_yO_{4-z}Cl_z$ spinel cathode material, the method comprising:
    mixing a lithium source, a chlorine source, and a manganese source to form a first mixture;
    calcining the first mixture to produce a homogeneously dispersed $Li_xMn_{2-y}Me_yO_{4-z}Cl_z$ spinel cathode material;
    mixing the homogeneously dispersed $Li_xMn_{2-y}Me_yO_{4-z}Cl_z$ spinel cathode material, a charge transfer catalyst salt, and a chelating agent to produce a second mixture;
    heating the second mixture to produce a gel;
    igniting the gel to form an ash; and
    calcining the ash to produce the coated homogeneously dispersed $Li_xMn_{2-y}Me_yO_{4-z}Cl_z$ spinel cathode material comprising a charge transfer catalyst coating,
    wherein the charged transfer catalyst coating comprises a compound that is selected from a group consisting of $MO_b$ and $MMn_aO_b$,
    wherein M is selected from a group consisting of bismuth, arsenic, and antimony,
    wherein Me is selected from a group consisting of iron, cobalt, and nickel, and
    wherein x ranges from 0.05 to 1.9, y ranges from 0.005 to 0.3, and z ranges from 0.005 to 0.25.

2. The method according to claim 1, wherein the lithium source is selected from a group consisting of lithium carbonate, lithium hydroxide, lithium oxide, lithium peroxide, and lithium nitrate,
    wherein the chlorine source is selected from a group consisting of lithium perchlorate, lithium chloride, manganese chloride, iron chloride, cobalt chloride, and nickel chloride, and
    wherein the manganese source is selected from the group consisting of manganese oxide, $(MnMe_f)O_2$, $(MnMe_f)_2O_3$, $(MnMe_f)_3O_4$, $(MnMe_f)O$, and manganese nitrate.

3. The method according to claim 1, wherein a ranges from 0 to 10.

4. The method according to claim 1, wherein b is greater than 0 or equal to or less than 22.

5. The method according to claim 1, further comprising:
    heating the first mixture to form an intermediate gel, and igniting the intermediate gel,
    wherein the first mixing step further comprises mixing a Group VIII Period 4 element source and the chelating agent.

6. The method according to claim 1, wherein the calcining steps comprise calcining the first mixture at 350° C. to 800° C. for 1 to 4 hours and calcining the ash at 350° C. to 800° C. for 1 to 4 hours.

7. The method according to claim 1, wherein the charge transfer catalyst salt is a compound selected from a group consisting of bismuth nitrate, arsenic nitrate, and antimony nitrate, and wherein the chelating agent is a compound selected from a group consisting of glycine, cellulose, citric acid, a cellulose-citric acid mixture, and urea.

8. The method according to claim 5, wherein the Group VIII Period 4 element source is selected from a group consisting of iron nitrate, cobalt nitrate, and nickel nitrate.

* * * * *